(12) United States Patent
Uchida

(10) Patent No.: US 9,690,647 B2
(45) Date of Patent: Jun. 27, 2017

(54) INFORMATION PROCESSING APPARATUS AND METHOD OF DIAGNOSIS

(71) Applicant: FUJITSU LIMITED, Kawasaki-shi, Kanagawa (JP)

(72) Inventor: Yasuhiko Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 14/926,407

(22) Filed: Oct. 29, 2015

(65) Prior Publication Data

US 2016/0162347 A1 Jun. 9, 2016

(30) Foreign Application Priority Data

Dec. 1, 2014 (JP) ................................. 2014-243500

(51) Int. Cl.
| | | |
|---|---|---|
| G06F 11/00 | (2006.01) | |
| G06F 11/07 | (2006.01) | |
| G06F 13/00 | (2006.01) | |
| G06F 15/00 | (2006.01) | |
| G06F 11/22 | (2006.01) | |

(52) U.S. Cl.
CPC ........ *G06F 11/079* (2013.01); *G06F 11/0724* (2013.01); *G06F 11/0745* (2013.01); *G06F 11/22* (2013.01); *G06F 13/00* (2013.01); *G06F 15/00* (2013.01)

(58) Field of Classification Search
CPC .............. G06F 11/079; G06F 11/0724; G06F 11/0745; G06F 11/22; G06F 11/221; G06F 11/2221; G06F 11/263; G06F 11/2635; G06F 13/00; G06F 15/00
See application file for complete search history.

(56) References Cited

U.S. PATENT DOCUMENTS

| | | | |
|---|---|---|---|
| 5,303,383 A | 4/1994 | Neches et al. | |
| 6,378,021 B1 * | 4/2002 | Okazawa | G06F 15/17375 710/104 |
| 6,856,600 B1 * | 2/2005 | Russell | H04L 41/0681 370/217 |
| 7,633,856 B2 * | 12/2009 | Ikawa | G06F 11/2005 370/217 |
| 7,895,300 B1 * | 2/2011 | Tansey | H04L 63/10 702/120 |

(Continued)

FOREIGN PATENT DOCUMENTS

| | | |
|---|---|---|
| JP | H05-207011 A | 8/1993 |
| JP | 2000-242520 A | 9/2000 |

(Continued)

OTHER PUBLICATIONS

Sosnowski, Janusz, Testing Crossbar Switch Interconnection Networks, 1993, IEEE, pp. 540-542.*

*Primary Examiner* — Marc Duncan
(74) *Attorney, Agent, or Firm* — Fujitsu Patent Center

(57) ABSTRACT

A building block includes an XSCF that controls the building block and an XBU that performs communication with another building block. The XSCF includes a hardware controller that instructs crossbar diagnosis to the XBU. The XBU includes a port information storage unit that stores therein diagnosis information related to the crossbar diagnosis and a test module that performs the crossbar diagnosis on the basis of the diagnosis information stored in the port information storage unit.

7 Claims, 34 Drawing Sheets

(56) References Cited

U.S. PATENT DOCUMENTS

| | | | |
|---|---|---|---|
| 8,000,322 B2 * | 8/2011 | Greener | ............... G06F 11/221 365/201 |
| 8,832,349 B2 * | 9/2014 | Numata | ............... G06F 15/177 710/317 |
| 2006/0023625 A1 | 2/2006 | Igawa | |

FOREIGN PATENT DOCUMENTS

| | | |
|---|---|---|
| JP | 2006-39897 A | 2/2006 |
| JP | 2009-266047 A | 11/2009 |

* cited by examiner

FIG.11

| BBID | PPAR | ASSIGN-MENT STATE | POWER STATE | CON-NECTION STATE | SETTING STATE | TEST STATE | FAILURE STATE |
|---|---|---|---|---|---|---|---|
| 0 | 0 | A | y | y | y | P | N |
| 1 | 0 | A | y | y | y | P | N |
| 2 | 0 | A | y | y | y | P | N |
| 3 | 0 | A | y | y | y | P | N |
| 4 | 0 | A | y | y | y | P | N |
| 5 | 0 | A | y | y | y | P | N |
| 6 | 1 | A | n | n | n | P | N |
| 7 | 1 | A | n | n | n | P | N |

FIG.12

| PPAR-ID | PPAR STATE |
|---|---|
| 0 | POWER SHUTOFF |
| 1 | INITIALIZING |
| 2 | OPERATING |
| 3 | UNSET |
| 4 | UNSET |
| 5 | ABNORMAL STATE |
| 6 | INITIALIZED |
| 7 | POWER SHUTOFF |

FIG.15

| BBID | PORT NUMBER | CONNECTION DESTINATION BBID | CONNECTION DESTINATION PORT NUMBER | PORT TYPE |
|---|---|---|---|---|
| 0 | 0 | 1 | 0 | DIAGNOSIS PORT OR NORMAL PORT |
|  | 1 | 2 | 0 | DIAGNOSIS PORT OR NORMAL PORT |
|  | 2 | 3 | 0 | DIAGNOSIS PORT OR NORMAL PORT |
| 1 | 0 | 0 | 0 | DIAGNOSIS PORT OR NORMAL PORT |
|  | 1 | 2 | 1 | DIAGNOSIS PORT OR NORMAL PORT |
|  | 2 | 3 | 1 | DIAGNOSIS PORT OR NORMAL PORT |
| 2 | 0 | 0 | 1 | DIAGNOSIS PORT OR NORMAL PORT |
|  | 1 | 1 | 1 | DIAGNOSIS PORT OR NORMAL PORT |
|  | 2 | 3 | 2 | DIAGNOSIS PORT OR NORMAL PORT |
| 3 | 0 | 0 | 2 | DIAGNOSIS PORT OR NORMAL PORT |
|  | 1 | 1 | 2 | DIAGNOSIS PORT OR NORMAL PORT |
|  | 2 | 2 | 2 | DIAGNOSIS PORT OR NORMAL PORT |

FIG.16

| BBID | PORT NUMBER | CONNECTION DESTINATION BBID | CONNECTION DESTINATION PORT NUMBER | PORT TYPE |
|---|---|---|---|---|
| 80 | 0 | 0 | 0 | DIAGNOSIS PORT OR NORMAL PORT |
|  | 1 | 1 | 0 | DIAGNOSIS PORT OR NORMAL PORT |
|  | ⋮ | ⋮ |  |  |
|  | 14 | 14 | 0 | DIAGNOSIS PORT OR NORMAL PORT |
|  | 15 | 15 | 0 | DIAGNOSIS PORT OR NORMAL PORT |
| 0 | 0 | 80 | 0 | DIAGNOSIS PORT OR NORMAL PORT |
|  | 1 | NOT INSTALLED | NOT INSTALLED | NOT INSTALLED |
|  | 2 | NOT INSTALLED | NOT INSTALLED | NOT INSTALLED |
| 1 | 0 | 80 | 1 | DIAGNOSIS PORT OR NORMAL PORT |
|  | 1 | NOT INSTALLED | NOT INSTALLED | NOT INSTALLED |
|  | 2 | NOT INSTALLED | NOT INSTALLED | NOT INSTALLED |
| ⋮ | ⋮ | ⋮ | ⋮ | ⋮ |
| 14 | 0 | 80 | 14 | DIAGNOSIS PORT OR NORMAL PORT |
|  | 1 | NOT INSTALLED | NOT INSTALLED | NOT INSTALLED |
|  | 2 | NOT INSTALLED | NOT INSTALLED | NOT INSTALLED |
| 15 | 0 | 80 | 15 | DIAGNOSIS PORT OR NORMAL PORT |
|  | 1 | NOT INSTALLED | NOT INSTALLED | NOT INSTALLED |
|  | 2 | NOT INSTALLED | NOT INSTALLED | NOT INSTALLED |

| BBID | STATE OF BB | POWER-ON PATTERN EXCLUSIVE FOR DIAGNOSIS |
|---|---|---|
| BB #0 | BB IS OPERATING<br>XBU IS OPERATING<br>PARTIAL XB PORT IS STOPPED | PATTERN #3 |
| BB #1 | BB IS OPERATING<br>XBU IS OPERATING<br>PARTIAL XB PORT IS STOPPED | PATTERN #3 |
| BB #2 | BB IS STOPPED | PATTERN #1 |
| BB #3 | BB IS OPERATING<br>XBU IS STOPPED<br>PARTIAL XB PORT IS STOPPED | PATTERN #3 |

FIG.22

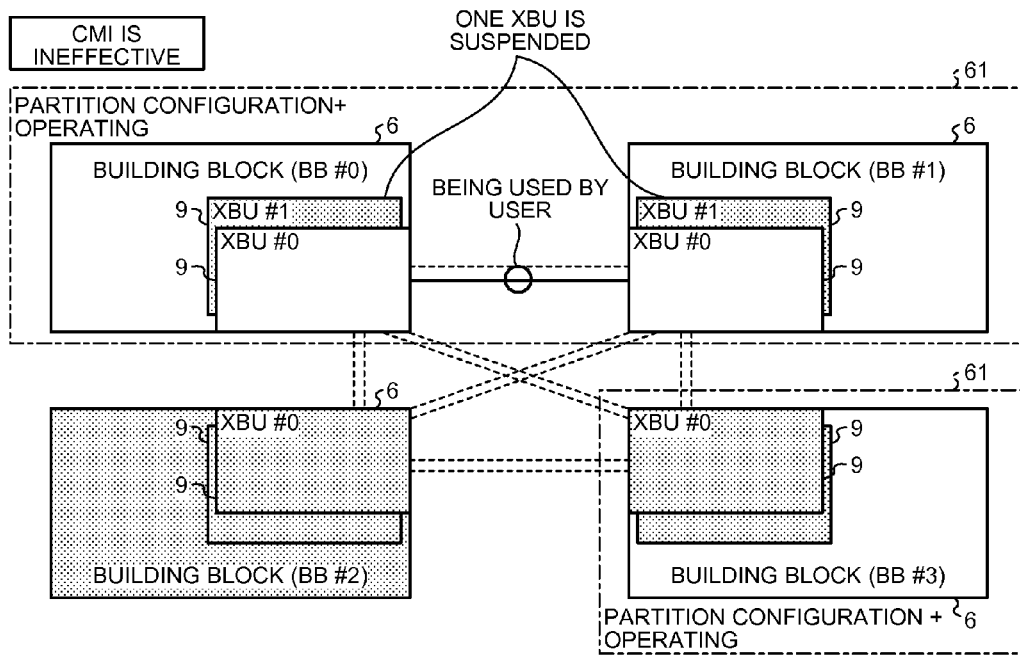

| BBID | STATE OF BB | POWER-ON PATTERN EXCLUSIVE FOR DIAGNOSIS |
|---|---|---|
| BB #0 | BB IS OPERATING<br>XBU #1 IS STOPPED<br>XBU #0 IS OPERATING<br>PARTIAL XB PORT IS STOPPED<br>(XBU #0) | XBU #1    PATTERN #2<br>XBU #0    PATTERN #3 |
| BB #1 | BB IS OPERATING<br>XBU #1 IS STOPPED<br>XBU #0 IS OPERATING<br>PARTIAL XB PORT IS STOPPED<br>(XBU #0) | XBU #1    PATTERN #2<br>XBU #0    PATTERN #3 |
| BB #2 | BB IS STOPPED | PATTERN #1 |
| BB #3 | BB IS OPERATING<br>XBU IS STOPPED | PATTERN #2 |

FIG.23

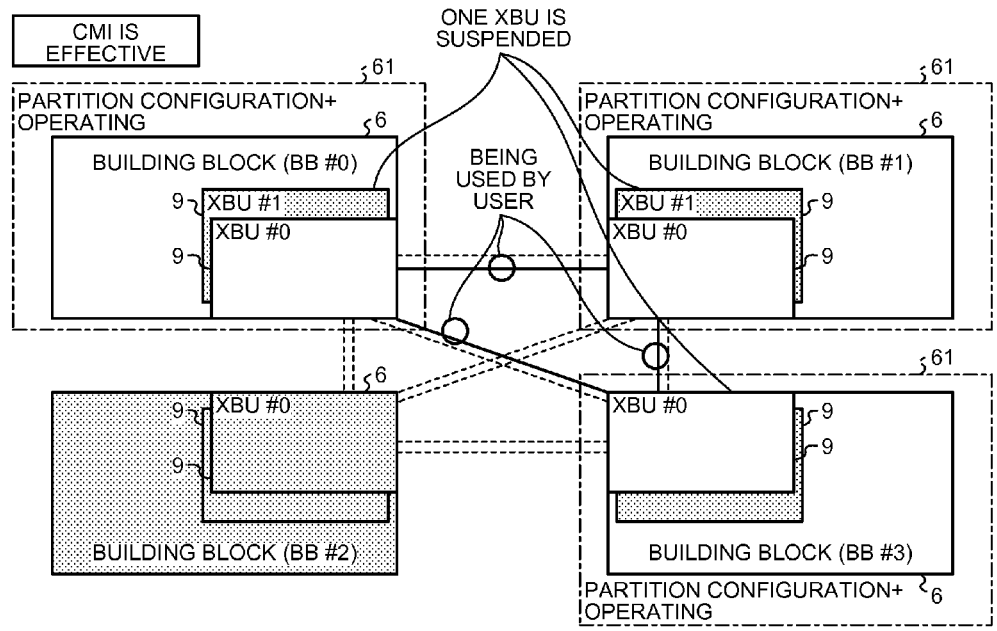

| BBID | STATE OF BB | POWER-ON PATTERN EXCLUSIVE FOR DIAGNOSIS |
|---|---|---|
| BB #0 | BB IS OPERATING<br>XBU #1 IS STOPPED<br>XBU #0 IS OPERATING<br>PARTIAL XB PORT IS STOPPED<br>(XBU #0) | XBU #1    PATTERN #2<br>XBU #0    PATTERN #3 |
| BB #1 | BB IS OPERATING<br>XBU #1 IS STOPPED<br>XBU #0 IS OPERATING<br>PARTIAL XB PORT IS STOPPED<br>(XBU #0) | XBU #1    PATTERN 2<br>XBU #0    PATTERN #3 |
| BB #2 | BB IS STOPPED | PATTERN #1 |
| BB #3 | BB IS OPERATING<br>XBU #1 IS STOPPED<br>XBU #0 IS OPERATING<br>PARTIAL XB PORT IS STOPPED<br>(XBU #0) | XBU #1    PATTERN #2<br>XBU #0    PATTERN #3 |

FIG.24

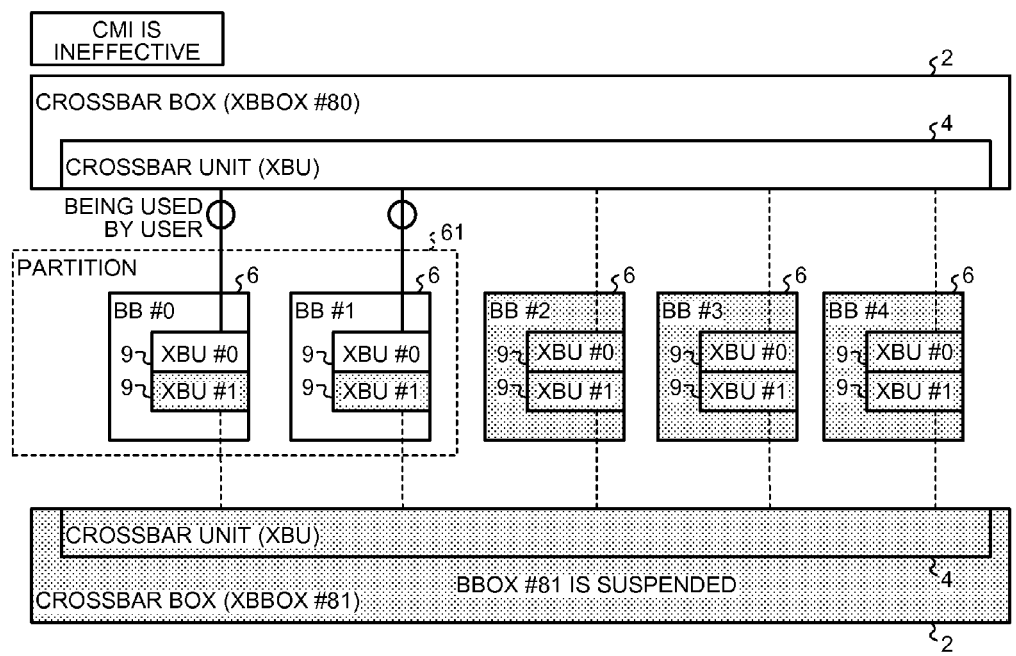

| BBID | STATE OF BB | POWER-ON PATTERN EXCLUSIVE FOR DIAGNOSIS |
|---|---|---|
| XBBOX #80 | XBBOX IS OPERATING<br>XBU IS OPERATING<br>PARTIAL XB PORT IS STOPPED | PATTERN #3 |
| XBBOX #81 | XBBOX IS STOPPED | PATTERN #1 |
| BB #0 | BB IS OPERATING<br>XBU #1 IS STOPPED<br>XBU #0 IS OPERATING<br>PARTIAL XB PORT IS STOPPED<br>(XBU #0) | XBU #1    PATTERN #2<br>XBU #0    NOT DIAGNOSED |
| BB #1 | BB IS OPERATING<br>XBU #1 IS STOPPED<br>XBU #0 IS OPERATING<br>PARTIAL XB PORT IS STOPPED<br>(XBU #0) | XBU #1    PATTERN #2<br>XBU #0    NOT DIAGNOSED |
| BB #2 | BB IS STOPPED | PATTERN #1 |
| BB #3 | BB IS STOPPED | PATTERN #1 |
| BB #4 | BB IS STOPPED | PATTERN #1 |

FIG.25

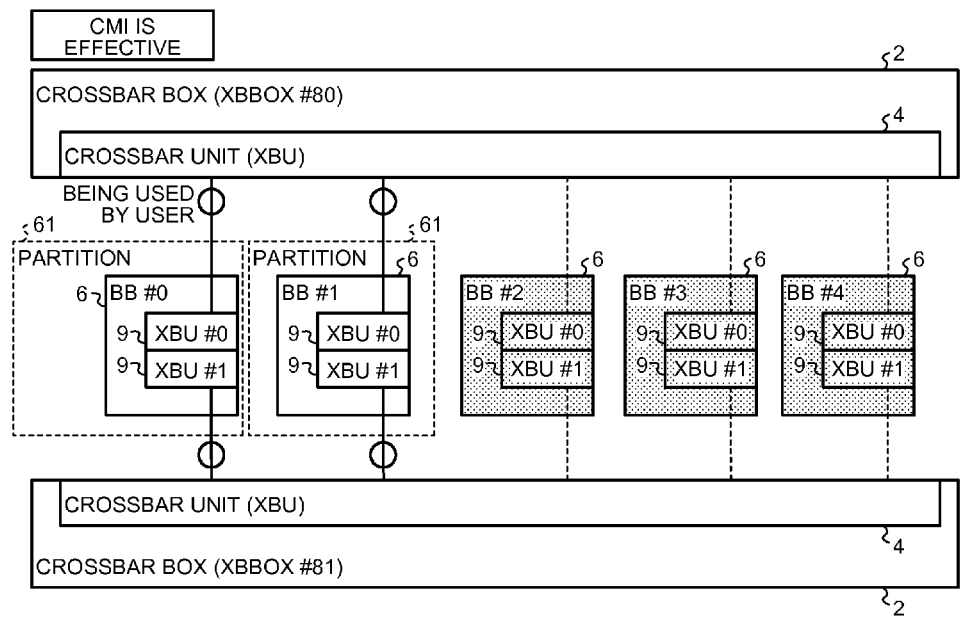

| BBID | STATE OF BB | POWER-ON PATTERN EXCLUSIVE FOR DIAGNOSIS |
|---|---|---|
| XBBOX #80 | XBBOX IS OPERATING<br>XBU IS OPERATING<br>PARTIAL XB PORT IS STOPPED | PATTERN #3 |
| XBBOX #81 | XBBOX IS OPERATING<br>XBU IS OPERATING<br>PARTIAL XB PORT IS STOPPED | PATTERN #3 |
| BB #0 | BB IS OPERATING<br>XBU IS OPERATING<br>ALL XB PORTS ARE OPERATING | NOT DIAGNOSED |
| BB #1 | BB IS OPERATING<br>XBU IS OPERATING<br>ALL XB PORTS ARE OPERATING | NOT DIAGNOSED |
| BB #2 | BB IS STOPPED | PATTERN #1 |
| BB #3 | BB IS STOPPED | PATTERN #1 |
| BB #4 | BB IS STOPPED | PATTERN #1 |

FIG.29

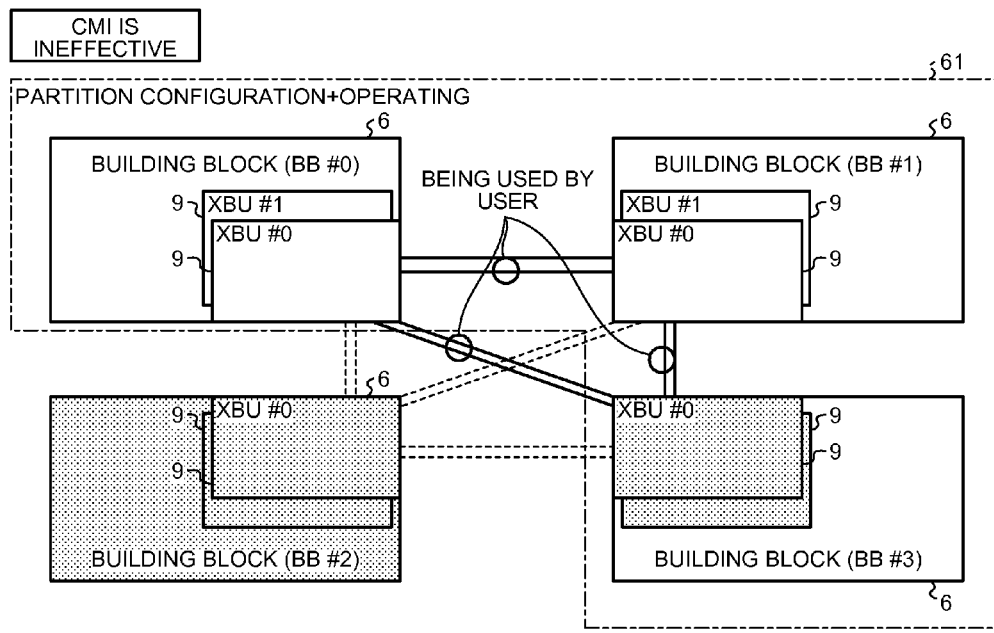

| BBID | PORT NUMBER | CONNECTION DESTINATION BBID [XBU #0/1] | CONNECTION DESTINATION PORT NUMBER [XBU #0/1] | PORT TYPE [XBU #0/1] |
|---|---|---|---|---|
| 0 | 0 | 1/1 | 0/0 | NORMAL PORT/NORMAL PORT |
|  | 1 | 2/2 | 0/0 | DIAGNOSIS PORT/DIAGNOSIS PORT |
|  | 2 | 3/3 | 0/0 | NORMAL PORT/NORMAL PORT |
| 1 | 0 | 0/0 | 0/0 | NORMAL PORT/NORMAL PORT |
|  | 1 | 2/2 | 1/1 | DIAGNOSIS PORT/DIAGNOSIS PORT |
|  | 2 | 3/3 | 1/1 | NORMAL PORT/NORMAL PORT |
| 2 | 0 | 0/0 | 1/1 | DIAGNOSIS PORT/DIAGNOSIS PORT |
|  | 1 | 1/1 | 1/1 | DIAGNOSIS PORT/DIAGNOSIS PORT |
|  | 2 | 3/3 | 2/2 | DIAGNOSIS PORT/DIAGNOSIS PORT |
| 3 | 0 | 0/0 | 2/2 | NORMAL PORT/NORMAL PORT |
|  | 1 | 1/1 | 2/2 | NORMAL PORT/NORMAL PORT |
|  | 2 | 2/2 | 2/2 | DIAGNOSIS PORT/DIAGNOSIS PORT |

FIG.30

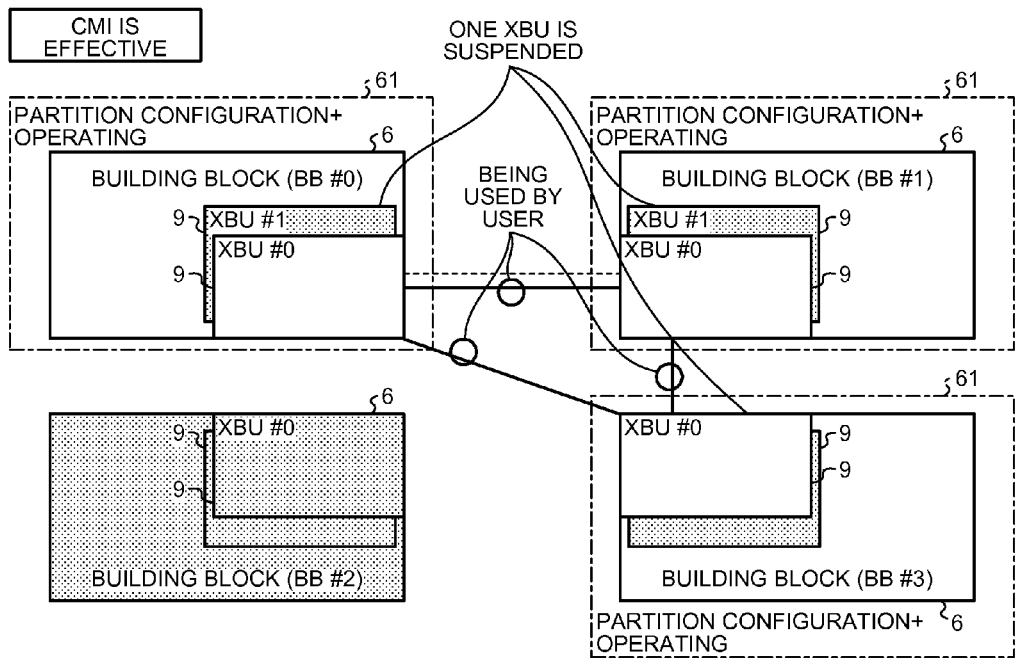

| BBID | PORT NUMBER | CONNECTION DESTINATION BBID [XBU #0/1] | CONNECTION DESTINATION PORT NUMBER [XBU #0/1] | PORT TYPE [XBU #0/1] |
|---|---|---|---|---|
| 0 | 0 | 1/1 | 0/0 | NORMAL PORT/DIAGNOSIS PORT |
|   | 1 | 2/2 | 0/0 | DIAGNOSIS PORT/DIAGNOSIS PORT |
|   | 2 | 3/3 | 0/0 | NORMAL PORT/DIAGNOSIS PORT |
| 1 | 0 | 0/0 | 0/0 | NORMAL PORT/DIAGNOSIS PORT |
|   | 1 | 2/2 | 1/1 | DIAGNOSIS PORT/DIAGNOSIS PORT |
|   | 2 | 3/3 | 1/1 | NORMAL PORT/DIAGNOSIS PORT |
| 2 | 0 | 0/0 | 1/1 | DIAGNOSIS PORT/DIAGNOSIS PORT |
|   | 1 | 1/1 | 1/1 | DIAGNOSIS PORT/DIAGNOSIS PORT |
|   | 2 | 3/3 | 2/2 | DIAGNOSIS PORT/DIAGNOSIS PORT |
| 3 | 0 | 0/0 | 2/2 | NORMAL PORT/DIAGNOSIS PORT |
|   | 1 | 1/1 | 2/2 | NORMAL PORT/DIAGNOSIS PORT |
|   | 2 | 2/2 | 2/2 | DIAGNOSIS PORT/DIAGNOSIS PORT |

FIG.31

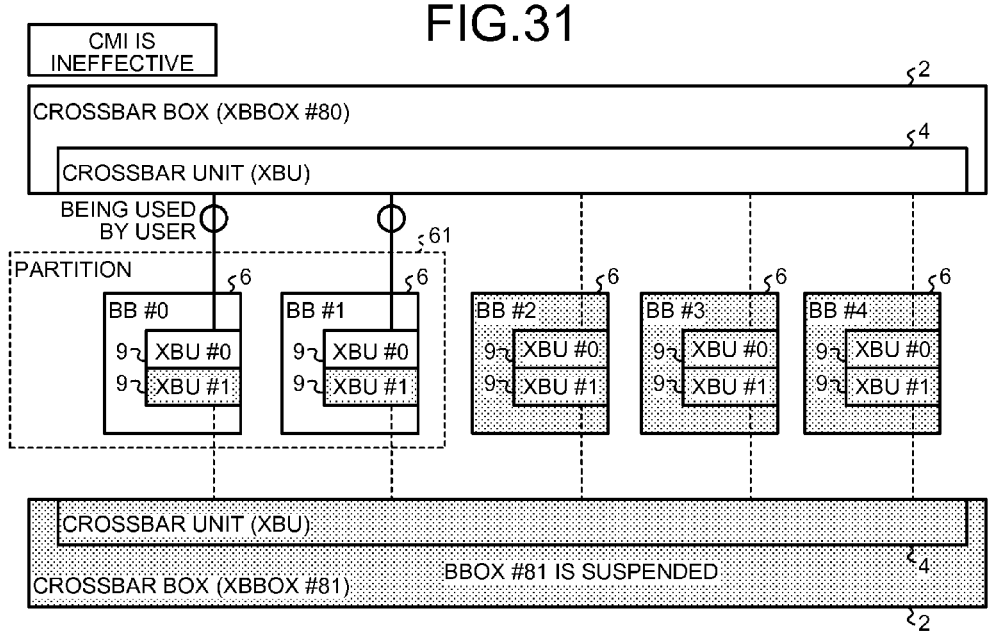

| BBID | PORT NUMBER | CONNECTION DESTINATION BBID [XBU #0/1] | CONNECTION DESTINATION PORT NUMBER [XBU #0/1] | PORT TYPE [XBU #0/1] |
|---|---|---|---|---|
| 80 | 0 | 0 | 0 | NORMAL PORT |
|  | 1 | 1 | 0 | NORMAL PORT |
|  | 2 | 2 | 0 | DIAGNOSIS PORT |
|  | 3 | 3 | 0 | DIAGNOSIS PORT |
|  | 4 | 4 | 0 | DIAGNOSIS PORT |
|  | 5 TO 15 | NOT INSTALLED | NOT INSTALLED | NOT INSTALLED |
| 81 | 0 | 0 | 0 | DIAGNOSIS PORT |
|  | 1 | 1 | 0 | DIAGNOSIS PORT |
|  | 2 | 2 | 0 | DIAGNOSIS PORT |
|  | 3 | 3 | 0 | DIAGNOSIS PORT |
|  | 4 | 4 | 0 | DIAGNOSIS PORT |
|  | 5 TO 15 | NOT INSTALLED | NOT INSTALLED | NOT INSTALLED |
| 0 | 0 | 80/81 | 0/0 | NORMAL PORT/DIAGNOSIS PORT |
|  | 1 TO 2 | NOT INSTALLED | NOT INSTALLED | NOT INSTALLED |
| 1 | 0 | 80/81 | 0/0 | NORMAL PORT/DIAGNOSIS PORT |
|  | 1 TO 2 | NOT INSTALLED | NOT INSTALLED | NOT INSTALLED |
| 2 | 0 | 80/81 | 0/0 | DIAGNOSIS PORT/DIAGNOSIS PORT |
|  | 1 TO 2 | NOT INSTALLED | NOT INSTALLED | NOT INSTALLED |
| 3 | 0 | 80/81 | 0/0 | DIAGNOSIS PORT/DIAGNOSIS PORT |
|  | 1 TO 2 | NOT INSTALLED | NOT INSTALLED | NOT INSTALLED |
| 4 | 0 | 80/81 | 0/0 | DIAGNOSIS PORT/DIAGNOSIS PORT |
|  | 1 TO 2 | NOT INSTALLED | NOT INSTALLED | NOT INSTALLED |

FIG.32

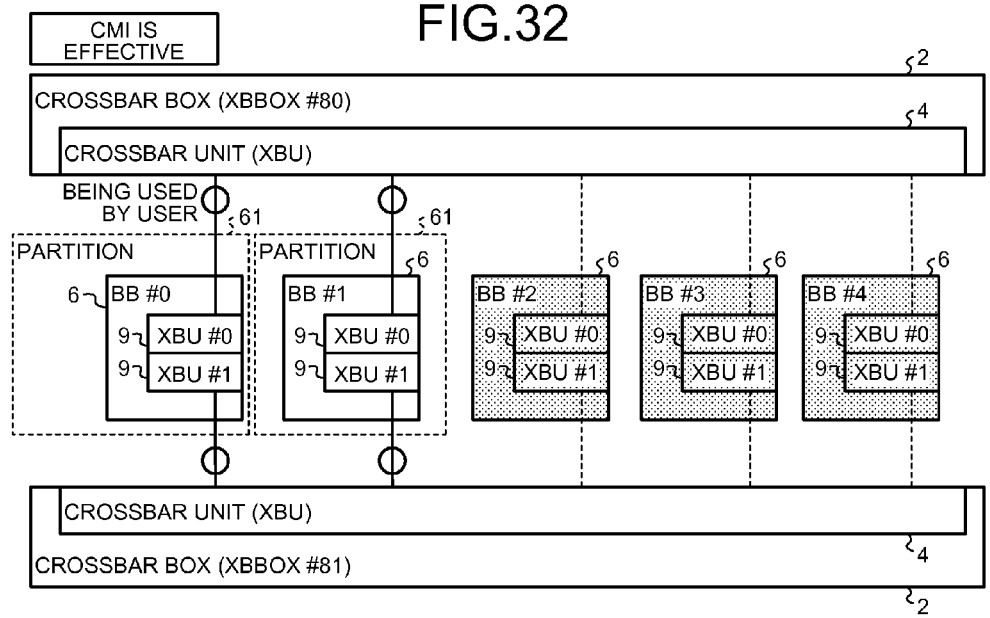

| BBID | PORT NUMBER | CONNECTION DESTINATION BBID [XBU #0/1] | CONNECTION DESTINATION PORT NUMBER [XBU #0/1] | PORT TYPE [XBU#0/1] |
|---|---|---|---|---|
| 80 | 0 | 0 | 0 | NORMAL PORT |
|  | 1 | 1 | 0 | NORMAL PORT |
|  | 2 | 2 | 0 | DIAGNOSIS PORT |
|  | 3 | 3 | 0 | DIAGNOSIS PORT |
|  | 4 | 4 | 0 | DIAGNOSIS PORT |
|  | 5 TO 15 | NOT INSTALLED | NOT INSTALLED | NOT INSTALLED |
| 81 | 0 | 0 | 0 | NORMAL PORT |
|  | 1 | 1 | 0 | NORMAL PORT |
|  | 2 | 2 | 0 | DIAGNOSIS PORT |
|  | 3 | 3 | 0 | DIAGNOSIS PORT |
|  | 4 | 4 | 0 | DIAGNOSIS PORT |
|  | 5 TO 15 | NOT INSTALLED | NOT INSTALLED | NOT INSTALLED |
| 0 | 0 | 80/81 | 0/0 | NORMAL PORT/NORMAL PORT |
|  | 1 TO 2 | NOT INSTALLED | NOT INSTALLED | Not Installed |
| 1 | 0 | 80/81 | 0/0 | NORMAL PORT/NORMAL PORT |
|  | 1 TO 2 | NOT INSTALLED | NOT INSTALLED | NOT INSTALLED |
| 2 | 0 | 80/81 | 0/0 | DIAGNOSIS PORT/DIAGNOSIS PORT |
|  | 1 TO 2 | NOT INSTALLED | NOT INSTALLED | NOT INSTALLED |
| 3 | 0 | 80/81 | 0/0 | DIAGNOSIS PORT/DIAGNOSIS PORT |
|  | 1 TO 2 | NOT INSTALLED | NOT INSTALLED | NOT INSTALLED |
| 4 | 0 | 80/81 | 0/0 | DIAGNOSIS PORT/DIAGNOSIS PORT |
|  | 1 TO 2 | NOT INSTALLED | NOT INSTALLED | NOT INSTALLED |

FIG.39

```
EXECUTION EXAMPLES:
XSCF> diagxbu 0-3
XBU diagnosis is about to start, Continue?[y|n]:y
Power on sequence started. [7200sec]
  0..... 30..... 60..... 90.....120end
XBU diagnosis started. [7200sec]
  0..... 30..... 60..... 90.....120end
completed.
Power off sequence started. [1200sec]
  0..... 30..... 60..... 90.....120end
completed.
```

FIG.40

```
■ XB COMMUNICATION ABNORMALITY
Date: Dec 19 19:14:37 JST 2013
Code:xxxxxxxx-xxxxxxxxxxxxxxxx-xxxxxxxxxxxxxxxxxxxxxx
Status: Information        Occurred: Dec 19 19:14:22.839 JST 2013
FRU: /BB#4/XBU#1/CBL#0L, /BB#0/XBU#1/CBL#0L
Msg: XB access error ■ XB CABLE CONNECTION ERROR
Date: Dec 19 19:14:29 JST 2013
Code: xxxxxxxx-xxxxxxxxxxxxxxxx-xxxxxxxxxxxxxxxxxxxxxx
Status: Information        Occurred: Dec 19 19:14:22.714 JST 2013
FRU: /XBBOX#80/XBU#0/CBL#L3, /BB#0/XBU#0/CBL#0L
Msg: XB Cable connection test failure
```

INFORMATION PROCESSING APPARATUS AND METHOD OF DIAGNOSIS

CROSS-REFERENCE TO RELATED APPLICATION(S)

This application is based upon and claims the benefit of priority of the prior Japanese Patent Application No. 2014-243500, filed on Dec. 1, 2014, the entire contents of which are incorporated herein by reference.

FIELD

The embodiment discussed herein is related to an information processing apparatus and a method of diagnosis.

BACKGROUND

Information processing systems in which a plurality of information processing apparatuses, each of which has a central processing unit (CPU) and a memory, are combined have recently been used. Such an information processing system connects between the information processing apparatuses with a crossbar (XB), thereby enabling communication between the CPUs of different information processing apparatuses.

When the crossbar fails, communication between the information processing apparatuses becomes impossible, and the failure of the crossbar affects the entire information processing system. Given this situation, crossbar diagnosis is important in order to increase the reliability of the information processing system.

Given these circumstances, there is a crossbar diagnosing technique that locates a trouble by sending, for a crossbar switch under instructions from a CPU, a test pattern from a node as a data transfer source to another node in data transfer in which a trouble occurs.

There is a conventional technology that, when a trouble occurs in a switch, prevents a system failure by controlling so as to perform inter-node data transfer via a crossbar switch other than an inter-node crossbar switch including the switch in which the trouble occurs. Conventional technologies are disclosed in Japanese Laid-open Patent Publication No. 2000-242520 and Japanese Laid-open Patent Publication No. 2006-39897, for example.

However, the crossbar diagnosis technique under instructions from a CPU has the problem that, when the CPU is being used by an information processing system, diagnosis is not performed, unless the operation of the information processing system is stopped.

SUMMARY

According to an aspect of an embodiment, an information processing apparatus includes a controller that controls the information processing apparatus; and a crossbar unit that performs communication with another information processing apparatus, the controller comprising an instructing unit that instructs crossbar diagnosis to the crossbar unit, and the crossbar unit comprising: a diagnosis information storage unit that stores therein diagnosis information related to the crossbar diagnosis; and a diagnosing unit that performs the crossbar diagnosis on the basis of the diagnosis information stored in the diagnosis information storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of partition constitution information;

FIG. 12 is a diagram illustrating an example of partition operation information;

FIG. 15 is a diagram illustrating an example of port information setting values of a building block configuration;

FIG. 16 is a diagram illustrating an example of port information setting values of a crossbar box configuration;

FIG. 22 is a diagram illustrating a determination example #3 of the power-on pattern;

FIG. 23 is a diagram illustrating a determination example #4 of the power-on pattern;

FIG. 24 is a diagram illustrating a determination example #5 of the power-on pattern;

FIG. 25 is a diagram illustrating a determination example #6 of the power-on pattern;

FIG. 29 is a diagram illustrating a setting example #1 of port information;

FIG. 30 is a diagram illustrating a setting example #2 of the port information;

FIG. 31 is a diagram illustrating a setting example #3 of the port information;

FIG. 32 is a diagram illustrating a setting example #4 of the port information;

FIG. 39 is a diagram illustrating an execution example of diagnosis;

FIG. 40 is a diagram illustrating examples of an error log; and

DESCRIPTION OF EMBODIMENT

A preferred embodiment of the present invention will be explained with reference to accompanying drawings. The embodiment does not limit the disclosed technology.

Figure 1:
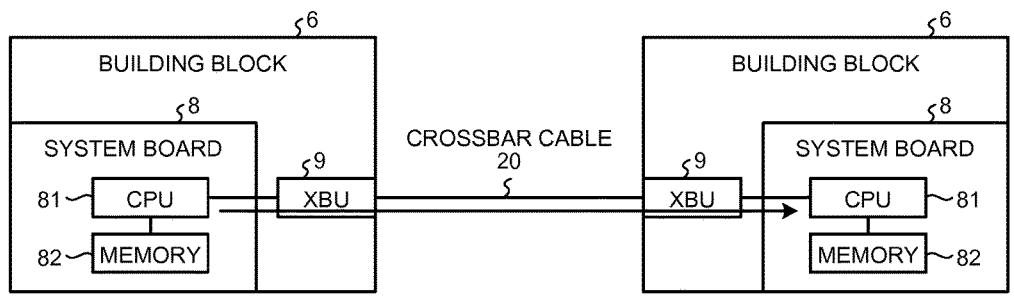
FIG. 1 is a diagram for illustrating a crossbar.

First, a crossbar will be explained. FIG. 1 is a diagram for illustrating the crossbar. As illustrated in FIG. 1, the crossbar connects between building blocks 6 with a crossbar cable 20, thereby enabling communication between CPUs 81 mounted on the building blocks 6. The building block 6 is a unit apparatus constructing an information processing system, and any numbers of building blocks 6 are combined with each other, thereby constructing a scalable information processing system.

The building block 6 includes a system board 8 and a crossbar unit (XBU) 9. The system beard 8 includes the CPU 81 and a memory 82 and performs information processing. The XBU 9 is an apparatus that controls data transfer between the CPUs 81 and is connected to another XBU 9 via the crossbar cable 20.

Figure 2:
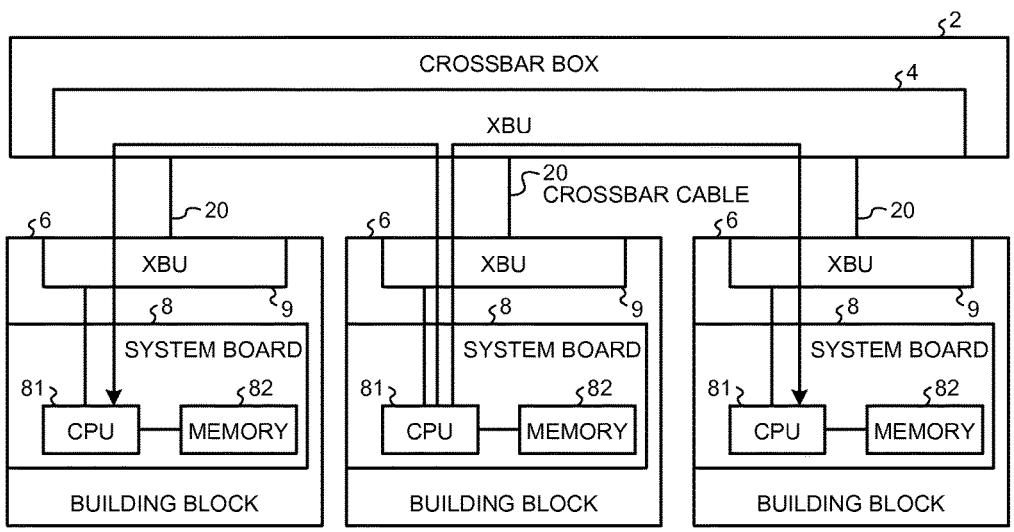
FIG. 2 is a diagram for illustrating a crossbar box.

FIG. 2 is a diagram for illustrating a crossbar box. As illustrated in FIG. 2, this crossbar box 2 includes an XBU 4 and is an apparatus that enables many building blocks 6 to be connected with the crossbar. In FIG. 2, three building blocks 6 are connected with the crossbar.

The XBU 4 is connected to the XBUs 9 of the building blocks 6 with the crossbar cables 20 and controls data transfer among the XBUs 9. Each of the building blocks 6 is connected to the crossbar box 2 with the crossbar cable 20. The crossbar box 2 performs routing control on data communication among the building blocks 6, thereby enabling data communication among the building blocks 6.

Figure 3:
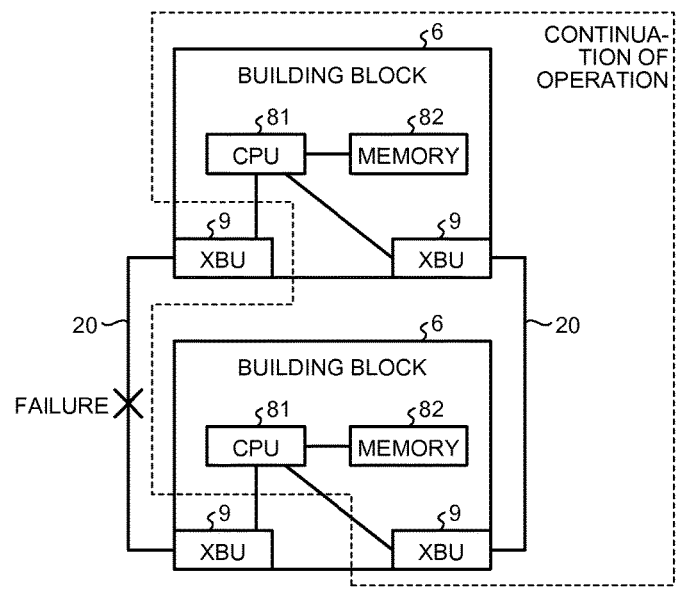
FIG. 3 is a diagram for illustrating redundancy of the crossbar.

FIG. 3 is a diagram for illustrating redundancy of the crossbar. As illustrated in FIG. 3, the building block 6 mounts two XBUs 9 and is connected to another building block 6 using two crossbar cables 20. Consequently, even when either one communication path becomes uncommunicable due to a failure, the other communication path is used, thereby enabling the continuation of the operation of the information processing system.

Figure 4:
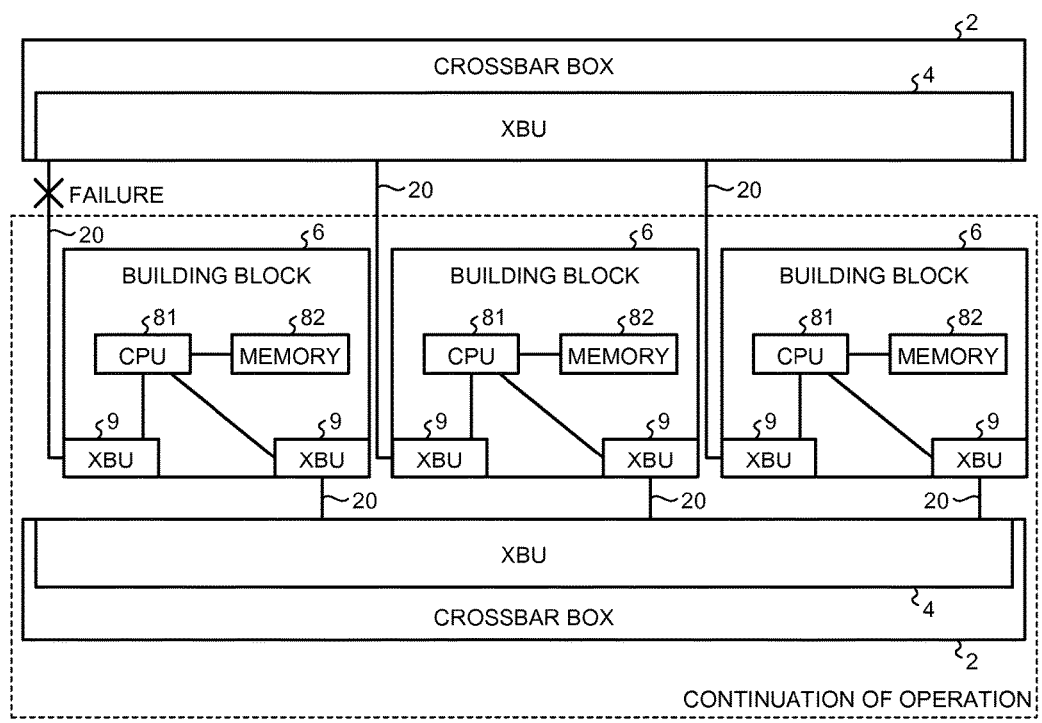
FIG. 4 is a diagram for illustrating redundancy of the crossbar box.

FIG. 4 is a diagram for illustrating redundancy of the crossbar box 2. As illustrated in FIG. 4, the building block 6 mounts two XBUs 9 and is connected to the two crossbar boxes 2 using the crossbar cables 20. Consequently, even when either one of the communication paths becomes uncommunicable due to a failure, the other communication path is used, thereby enabling the continuation of the operation of the information processing system.

Figure 5:
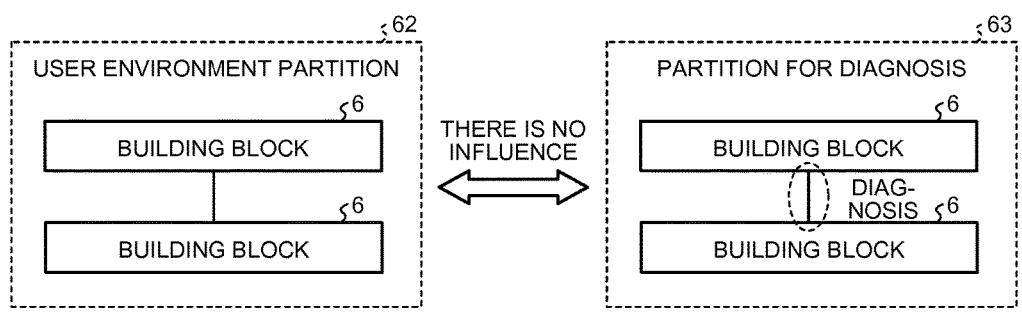
FIG. 5 is a diagram for illustrating crossbar diagnosis using a partition for diagnosis.

Next, crossbar diagnosis will be explained. FIG. 5 is a diagram for illustrating crossbar diagnosis using a partition for diagnosis. The partition is a divided information processing system obtained by grouping building blocks 6. An information processing system including a plurality of building blocks 6 is, for example, divided into a partition for each user.

The partition is an independent information processing system and is not affected by another partition. In FIG. 5, a user environment partition 62 is a group of building blocks 6 being used by a user, whereas a partition 63 for diagnosis is a group of building blocks 6 to be subjected to crossbar diagnosis. By thus constructing the partition 63 for diagnosis, crossbar diagnosis can be performed without affecting a user environment.

However, when a common memory interface (CMI) function is effective, even the use of the partition 63 for diagnosis affects the user environment partition 62. The CMI function is a function to use a memory 82 in a shared manner by a plurality of partitions.

Figure 6:
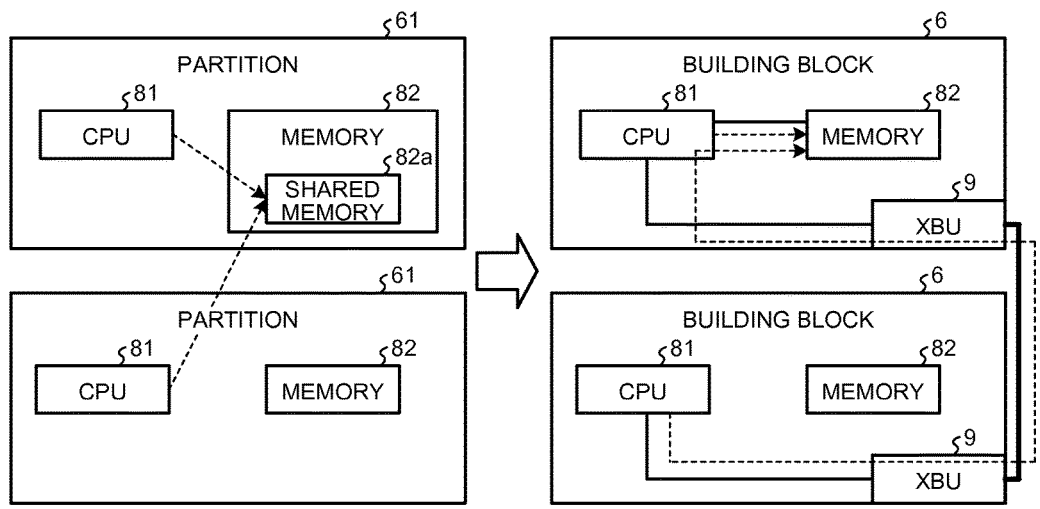
FIG. 6 is a diagram for illustrating a CMI function.

FIG. 6 is a diagram for illustrating the CMI function. Objects to be accessed by the CPU 81 are primarily limited to within the same partition 61. However, when the CMI function is made effective, the CPU 81 can access the memory 82 across partitions 61. FIG. 6 illustrates a case in which a shared memory 82a within the memory 82 of one partition 61 is accessed by the CPU 81 of another partition 61.

As illustrated in FIG. 6, when the CPU 81 accesses the memory 62 of the other partition 61, crossbar communication is used. In other words, the CPU 81 accesses the memory 82 of the other building block 6 via the XBU 9.

Figure 7:
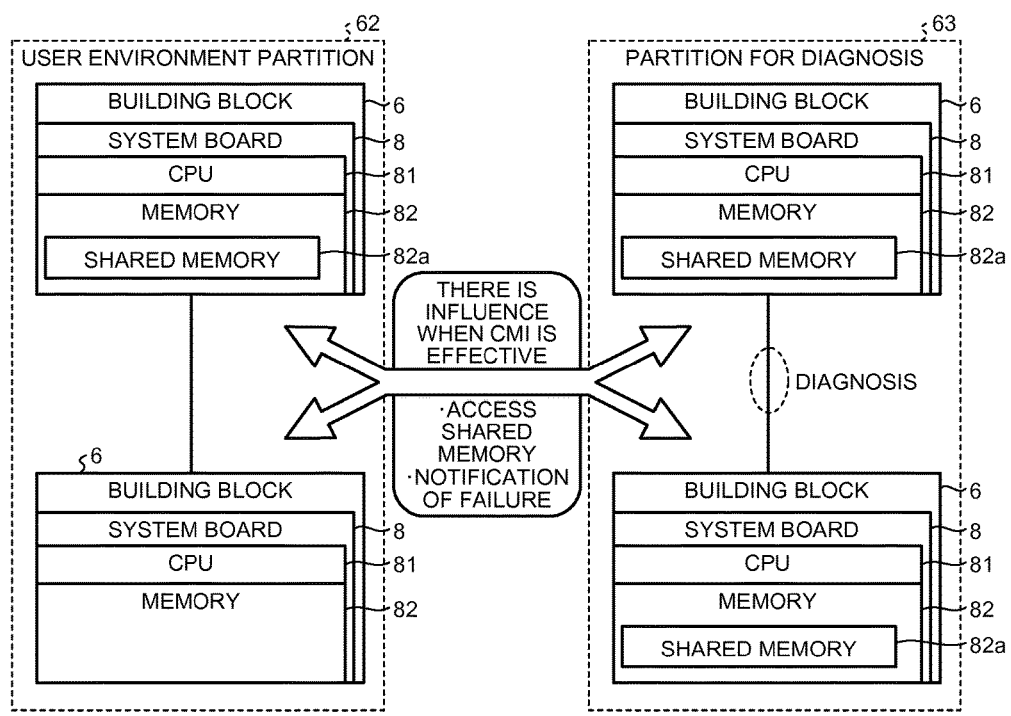
FIG. 7 is a diagram for illustrating a problem when CMI is effective.

FIG. 7 is a diagram for illustrating a problem when CMI is effective. When the CMI function is effective, access through the crossbar communication is limited to the shared memory 82a owing to hardware specifications. However, when the shared memory 82a is set, the shared memory 82a can be accessed from all partitions 61 through hardware functions. In FIG. 7, the shared memory 82a of the user environment partition 62 can be accessed also from the CPU 81 of the partition 63 for diagnosis.

When the CMI function is effective, the hardware includes a function to notify all partitions 61 of a failure in the building block 6. Given this situation, if a failure occurs during the crossbar diagnosis, all partitions 61 including the user environment are notified of the failure.

Given these circumstances, the crossbar diagnosis according to the present embodiment diagnoses the crossbar so as not to affect the user environment when CMI is effective. In other words, the crossbar diagnosis according to the present embodiment eliminates the influence of the crossbar diagnosis on the user environment partition 62 when the CMI function is effective.

Figure 8:
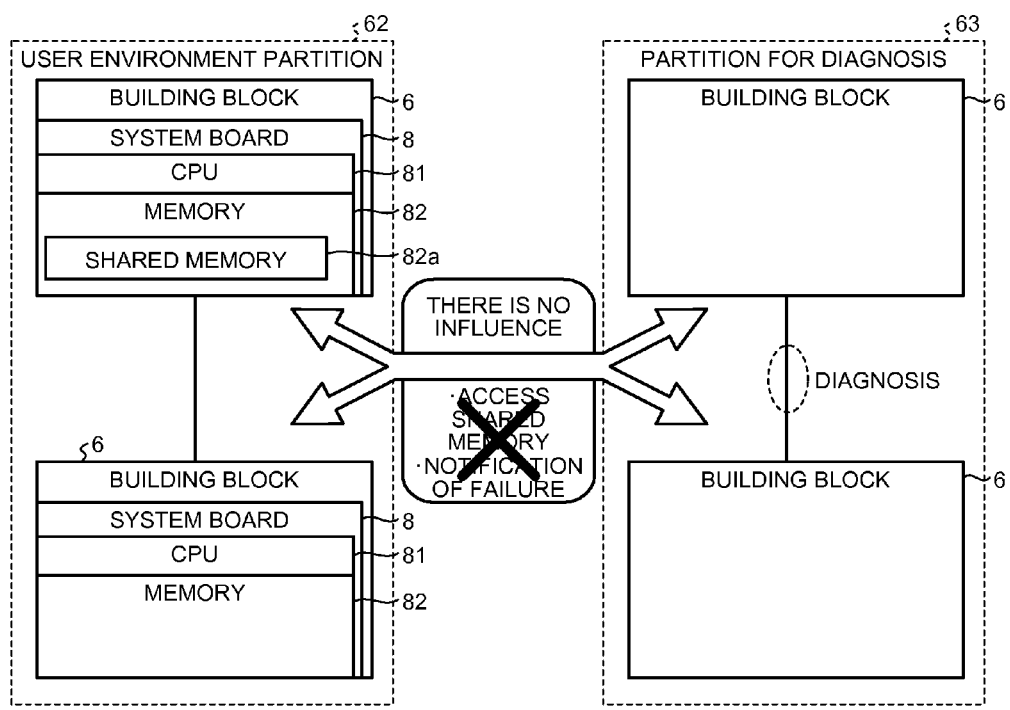
FIG. 8 is a diagram for illustrating crossbar diagnosis according to an embodiment.

FIG. 8 is a diagram for illustrating the crossbar diagnosis according to the present embodiment. As illustrated in FIG. 8, the crossbar diagnosis according to the present embodiment performs the crossbar diagnosis without creating the shared memory 82a in a diagnosis environment, that is, the partition 63 for diagnosis and prohibits access to the shared memory 82a of the user environment from the diagnosis environment. The crossbar diagnosis according to the present embodiment does not notify the user environment of a failure occurring in the diagnosis environment and does not cause the diagnosis environment to receive a failure notification of the user environment.

The crossbar diagnosis has a problem in that a configuration with the crossbar box 2 and the building block 6 alone cannot perform the crossbar diagnosis. The crossbar communication is performed using access between CPUs 81 and memories 82. For this reason, the crossbar communication requires the CPU 81 and the memory 82 in both a transmission source and a transmission destination. However, the CPU 81 and the memory 82 are not installed in the crossbar box 2 and are installed only in the building block 6. Given this situation, in order to diagnose a crossbar, two or more building blocks 6 are used.

Figure 9:
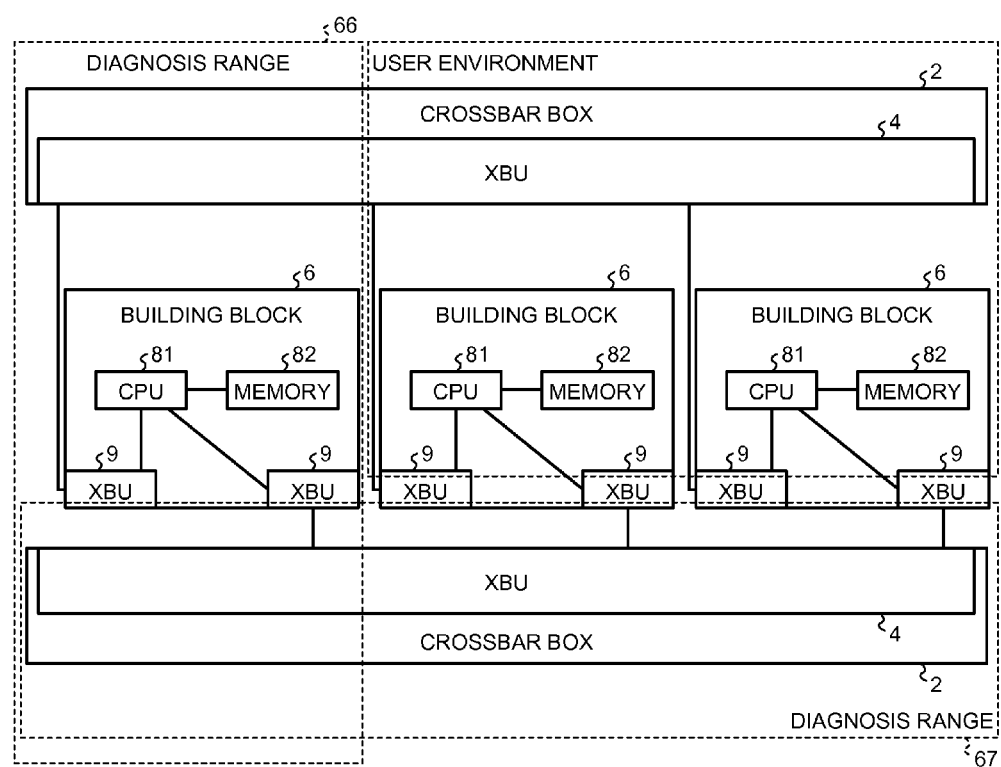
FIG. 9 is a diagram illustrating a diagnosable range.

Given these circumstances, in the crossbar diagnosis according to the present embodiment, the building block 6 performs the crossbar communication with the crossbar box 2 that does not install therein the CPU 81 or the memory 82 and enables the crossbar diagnosis even with one building block 6. In other words, the crossbar diagnosis according to the present embodiment enables diagnosis within a diagnosis range 66 illustrated in FIG. 9.

The crossbar diagnosis has another problem in that all building blocks 6 are required to be stopped when the crossbar box 2 is diagnosed. The crossbar has a redundant configuration, and when one crossbar box 2 is desired to be diagnosed, another crossbar box 2 and the building blocks 6 may be being used in the user environment. The crossbar box 2 is connected to all building blocks 6 with the crossbar cables 20. Given this situation, when the crossbar box 2 is desired to be diagnosed, the crossbar communication is required to be performed for all building blocks 6.

However, the crossbar communication is performed using the CPU 81 and the memory 82, and the CPUs 81 and the memories 82 of the respective building blocks 6 are required for the diagnosis. Consequently, when the crossbar box is diagnosed, all building blocks 6 that are being used by a user are required to be stopped.

Given these circumstances, in the crossbar diagnosis according to the present embodiment, the crossbar box 2 performs the crossbar communication for the XBU 9 installed in the building block 6 and enables the diagnosis of the crossbar box 2 without stopping the building blocks 6 that are being used in the user environment. In other words, the crossbar diagnosis according to the present embodiment enables diagnosis within a diagnosis range 67 illustrated in FIG. 9.

Figure 10:
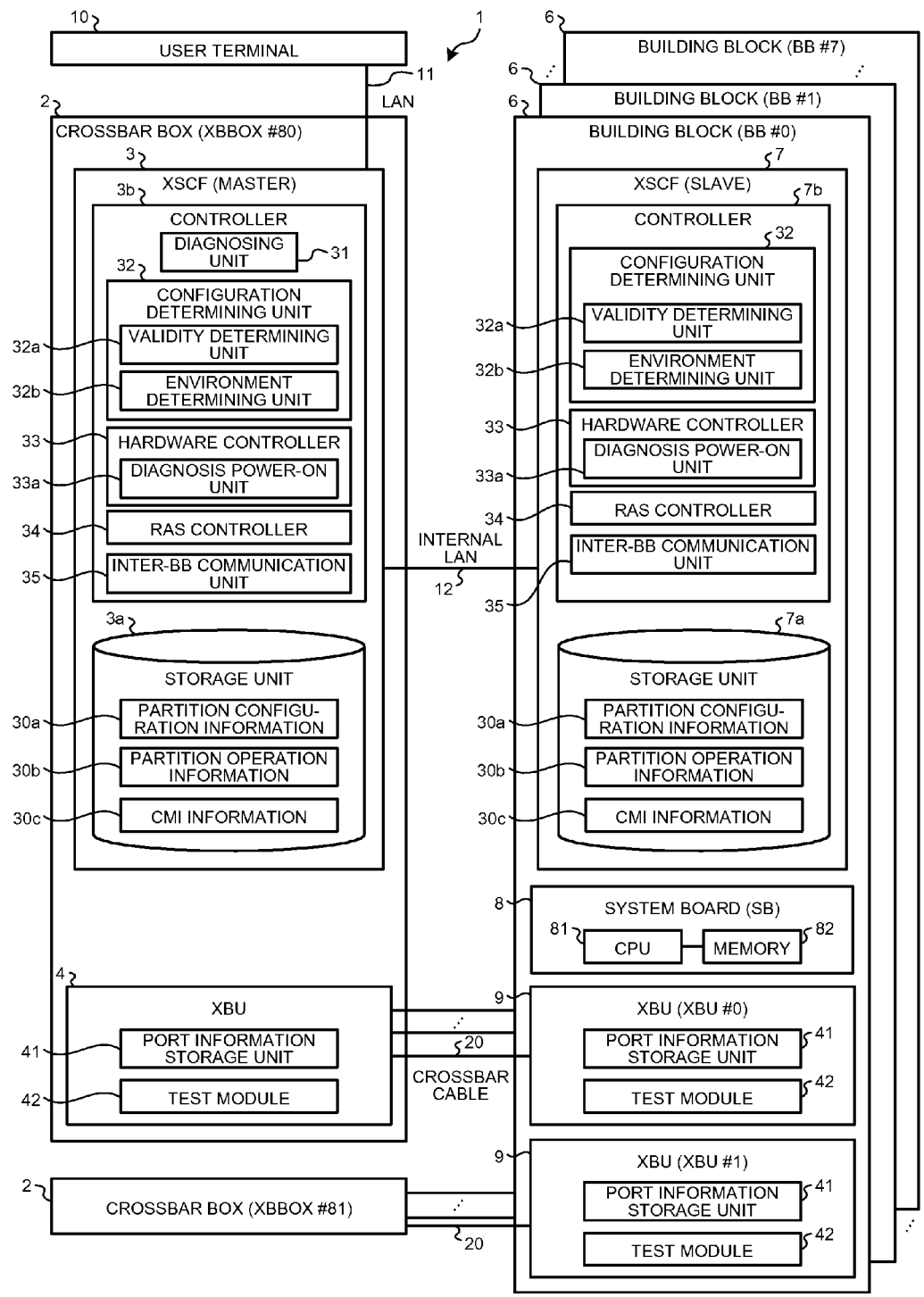
FIG. 10 is a diagram illustrating a configuration of an information processing system according to the present embodiment.

Next, a configuration of the information processing system according to the present embodiment will be explained. FIG. 10 is a diagram illustrating a configuration of the information processing system according to the present embodiment. As illustrated in FIG. 10, this information processing system 1 includes two crossbar boxes 2, eight building blocks 6, and a user terminal 10. In FIG. 10, the two crossbar boxes 2 are represented by XBBOX #80 and XBBOX #81, whereas the eight building blocks 6 are represented by BB #0 to BB #7.

"XB" represents a crossbar, "XBBOX" represents a crossbar box, and "BB" represents a building block. Although the eight building blocks 6 are illustrated for the convenience of explanation, the information processing system 1 may include more numbers of or less numbers of building blocks 6.

The crossbar box 2 includes an XSCF 3 and the XBU 4. The building block 6 includes an XSCF 7, the system board 8, and two XBUs 9. The user terminal 10 is a personal computer (PC) used by a user. The user terminal 10 is connected to the XSCF 3 via a local area network (LAN) 11, and the use can perform designation of a partition configuration, an instruction for crossbar diagnosis, an instruction for power control, or the like from the user terminal 10 to the XSCF 3.

The XSCF 3 is a system controller that controls the crossbar box 2. The XSCF 7 is a system controller that controls the building blocks 6. The information processing system 1 includes one XSCF 3 operating as a master and eight XSCFs 7 operating as slaves, and the XSCFs are connected to each other via an internal LAN 12.

The slave performs hardware control within the apparatus, whereas the master provides the user with services. The user makes a service request to the master, and the master that has received the request gives an instruction to the slave and collects information from the slave. The master also has a slave function. Although FIG. 10 illustrates a case in which the XSCF 3 of the crossbar box 2 is the master, the XSCF 7 of the building block 6 may operate as the master when the crossbar box 2 is not used, for example.

The XSCF 3 includes a storage unit 3a that stores therein information and a controller 3b that performs control using the storage unit 3a. The XSCF 7 includes a storage unit 7a that stores therein information and a controller 7b that performs control using the storage unit 7a. The storage unit 3a and the storage unit 7a store therein partition configuration information 30a, partition operation information 30b, and CMI information 30c. The controller 3b includes a diagnosing unit 31, a configuration determining unit 32, a hardware controller 33, an RAS controller 34, and an inter-BB communication unit 35. The controller 7b includes the configuration determining unit 32, the hardware controller 33, the RAS controller 34, and the inter-BB communication unit 35.

The partition configuration information 30a is information indicating a configuration of the partition 61 and states of the respective building blocks 6. FIG. 11 is a diagram illustrating an example of the partition configuration information 30a. As illustrated in FIG. 11, the partition configuration information 30a contains a BBID, a PPAR, an assignment state, a power state, a connection state, a setting state, a test state, and a failure state.

The BBID is a number identifying the building block 6. The PPAR is a number identifying the partition 61 in which the building block 6 is contained. The assignment state indicates whether the building block 6 is assigned (A) to any partition 61 or not (NA). The power state indicates whether the building block 6 is powered on (y) or not (n).

The connection state indicates whether the building block 6 is connected (y) so as to constitute the partition 61 or not (n). The setting state indicates whether the building block 6 is set so as to be available or not (n). The test state indicates whether the building block 5 has passed (P) a test or not (NP). The failure state indicates whether the building block 6 is normal (N) or not (F).

For example, the building block 6 the number of which is "0" is assigned to the partition 61 the number of which is "0," has been powered on, is available, has passed the test, and has a normal state.

The partition operation information 30b is information indicating an operation state of the partition. FIG. 12 is a diagram illustrating an example of the partition operation information 30b. As illustrated in FIG. 12, the partition operation information 30b contains a PPAR-ID and a PPAR state. The PPAR-ID is a number identifying the partition 61. The PPAR state indicates a state of the partition 61. The state of the partition 61 contains "power shutoff," "initializing," "initialized," "operating," "abnormal state," and "unset."

The CMI information 30c is information indicating whether the CMI function is effective. The storage unit 3a and the storage units 7a of the respective building blocks 6 store therein the same partition configuration information 30a, partition operation information 30b, and CMI information 30c by inter-BB communication.

The diagnosing unit 31 performs crossbar diagnosis using the configuration determining units 32, the hardware controllers 33, the RAS controllers 34, and the inter-BB communication units 35 of the crossbar box 2 and the respective building blocks 6.

The configuration determining unit 32 determines failure states and user usage states of various components of the apparatus. The configuration determining unit 32 includes a validity determining unit 32a and an environment determining unit 32b. The validity determining unit 32a determines the validity of an object to be diagnosed designated by the user. The environment determining unit 32b determines the user environment, that is, the user usage state of the apparatus, identifies a diagnosis range on the basis of the user usage state, and determines a power-on pattern of the identified diagnosis range.

Figure 13:
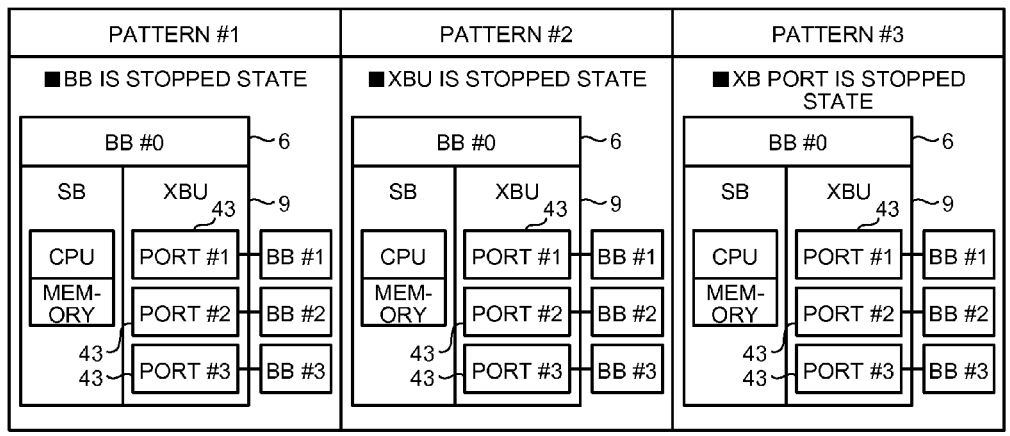
FIG. 13 is a diagram for illustrating a power-on pattern.

FIG. 13 is a diagram for illustrating the power on pattern. FIG. 13 illustrates a case in which the building block 6 includes one XBU 9 the XBU 9 includes three ports 43, and the environment determining unit 32b of the building block 6 determines a power-on processing pattern. The three ports 43 are represented by Port #1 to Port #3.

Pattern #1 is a case in which the building block 6 is stopped, the building block 6 and the XBU 9 are powered on, and the ports 43 of the XBU 9 are initialized. Pattern #2 is a case in which the XBU 9 is stopped, the XBU 9 is powered on, and the ports 43 of the XBU 9 are initialized. Pattern #3 is a case in which the ports 43 of the XBU 9 are stopped, and the ports 43 of the XBU 9 are initialized.

The hardware controller 33 performs hardware control on the components of the apparatus. The hardware controller 33 includes a diagnosis power-on unit 33a. The diagnosis power-on unit 33a includes processing for Pattern #1 to Pattern #3 as power-on processing exclusive for diagnosis and, on the basis of the pattern determined by the environment determining unit 32b, powers on components required for performing the crossbar diagnosis. When the diagnosis power-on unit 33a powers on the XBU, the diagnosis power-on unit 33a initializes the XBU and sets a port type described below.

The RAS controller 34 receives an abnormal notification from the hardware and performs analysis and the creation of an error log. The inter-BB communication unit 35 controls communication with another XSCF using the internal LAN 12. Using the communication by the inter-BB communication unit 35, the XSCF synchronizes the timing of processing performed by each functional unit and matches information stored in the storage units.

The XBU 4 and the XBU 9 each include a port information storage unit 41 and a test module 42. The port information storage unit 41 is provided for each port 43 and stores therein port information. The port information contains a port type and connection destination information. The port type indicates whether the port 43 is a diagnosis port that is used for the crossbar diagnosis or a normal port that is not used for the crossbar diagnosis. The port 43 that has been set as the diagnosis port transmits and receives data to and from the test module 42, whereas the port 43 that has been set an the normal part transmits and receives data to and from the CPU 81.

The connection destination information contains the BBID, an XBU number, and a port number of the building block 6 or the crossbar box 2 to be connected via the crossbar cable 20. The XBU number is a number identifying the XBU, whereas the port number is a number identifying the port 43. The port information is set by the XSCF at the time of the crossbar diagnosis and is used for determining a communication destination and checking reception data.

The test module 42 performs the crossbar diagnosis using the connection destination information when the port 43 is the diagnosis port. Specifically, the test module 42 performs communication with another test module 42 using the connection destination information, analyzes the communication result, and performs diagnosis on the crossbar communication.

Figure 14:
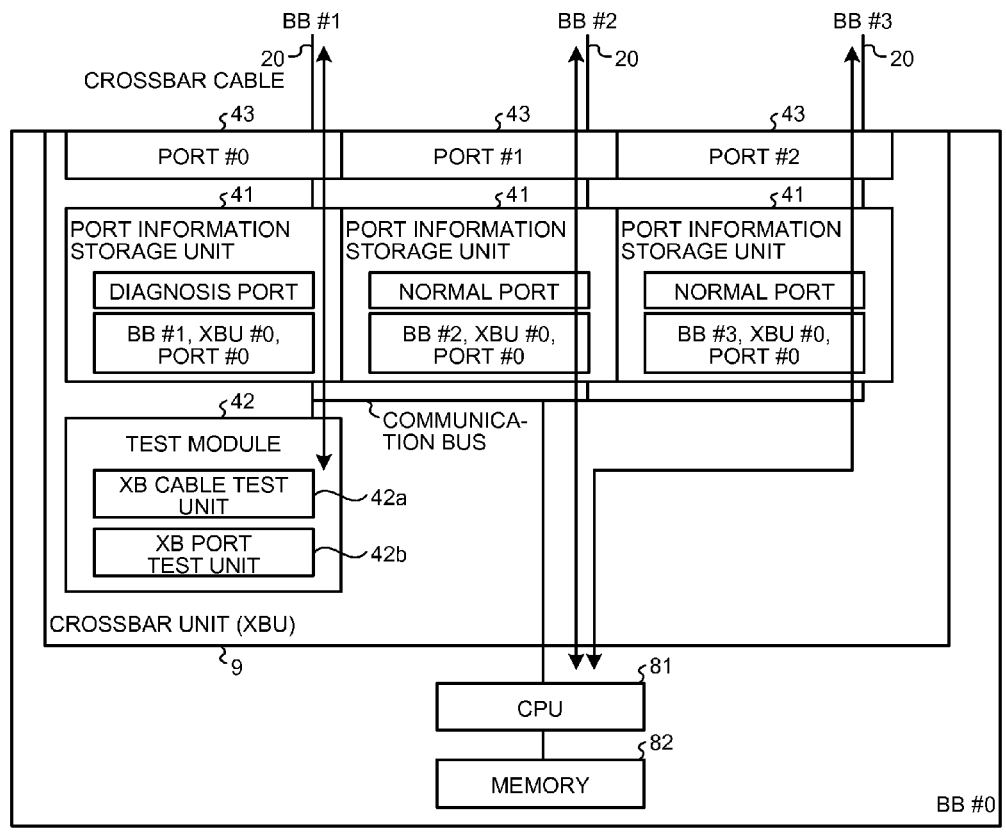
FIG. 14 is a diagram illustrating a configuration of an XBU.

FIG. 14 is a diagram illustrating a configuration of the XBU 9. With n as an integer, BB # n, XBU # n, and Port # n indicate the building block 6, the XBU, and the port 43, respectively, the number of which is identified by "n." In FIG. 14, BB #0 is connected to BB #1 to BB #3 with the XBU 9.

As illustrated in FIG. 14, the XBU 9 of BB #0 has three ports 43 represented by Port #0 to Port #2. The port information storage unit 41 corresponding to Port #0 stores therein the diagnosis port as the port type and BB #1, XBU #0, and Port #0 as the connection destination information. In other words, Port #0 of the XBU 9 of BB #0 is used for the crossbar diagnosis and is connected to the port 43 the number of which is identified by "0" of the XBU 9 the number of which is identified by "0" of the building block 6 the number of which is identified by "1."

The port information storage unit 41 corresponding to Port #1 stores therein the normal port as the port type and BB #2, XBU #0, and Port #0 as the connection destination information. In other words, Port #1 of the XBU 9 of BB #0 is not used for the crossbar diagnosis and is connected to the port 43 the number of which is identified by "0" of the XBU 9 the number of which is identified by "0" of the building block 6 the number of which is identified by "2." The port information storage unit 41 corresponding to Port #2 stores therein the normal port as the port type and BB #3, XBU #0, and Port #0 as the connection destination information. In other words, Port #2 of the XBU 9 of BB #0 is not used for the crossbar diagnosis and is connected to the port 43 the number of which is identified by "0" of the XBU 9 the number of which is identified by "0" of the building block 6 the number of which is identified by "3."

FIG. 15 is a diagram illustrating an example of port information setting values of a building block configuration. The building block configuration is a configuration in which the building blocks 6 are connected with the crossbar without using the crossbar box 2 as illustrated in FIG. 14. FIG. 15 illustrates a case in which each of the building blocks 6 has one XBU 9.

As illustrated in FIG. 15, a connection destination BBID, a connection destination port number, and a port type are set in each port 43 of each of the building blocks 6. The connection destination BBID is the number of the building block 6 as a connection destination. The connection destination port number is the number of the port 43 as the connection destination. When each of the building blocks 6 has a plurality of XBUs 9, the connection destination BBID, the number of the XBU 9 as the connection destination, and the connection destination port number are set in each port 43 of each XBU 9 of each of the building blocks 6.

FIG. 16 is a diagram illustrating an example of port information setting values of a crossbar box configuration.

The crossbar box configuration is a configuration in which the building blocks 6 are connected with the crossbar using the crossbar box 2 as illustrated in FIG. 2. FIG. 16 illustrates a case in which the crossbar box 2 and each of the building blocks 6 each have one XBU 9.

As illustrated in FIG. 16, a connection destination BBID, a connection destination port number, and a port type are set in each port 43 of the crossbar box 2 and each of the building blocks 6. "Not Installed" indicates that the port 43 is not installed. When the crossbar box 2 and each of the building blocks 6 have a plurality of XBUs, the connection destination BBID, the number of the XBU 9 as the connection destination, and the connection destination port number are set in each port 43 of each XBU of the crossbar box 2 and each of the building blocks 6.

Referring back to FIG. 14, the test module 42 includes an XB cable test unit 42a that performs an XB cable test and an XB port test unit 42b that performs an XB port test. The XB cable test unit. 42a tests whether the crossbar cable 20 is correctly connected for each port 43. The test module 42 of a transmission source transmits data on the BBID the XBU number, and the port number of the transmission source to a diagnosis port of a transmission destination. The test module 42 of the transmission destination checks whether the port information set in the port 43 that has received and reception data match. The XB cable test cannot detect any abnormality in the XB communication but can detect a connection error of the crossbar cable 20.

The XB port test unit 42b tests whether any failure occurs in the path of the crossbar communication. The XB port test unit 42b of the transmission source transmits a dummy packet to the diagnosis port of the transmission destination. The XB port test unit 42b of the transmission destination returns the received dummy packet, to the transmission source as it is. The XB port test unit 42b of the transmission source checks whether there is a mismatch between the returned data and the data at the time of transmission. The XB port test cannot detect any connection error of the crossbar cable 20 but can detect abnormalities in the crossbar communication such as a failure and cable disconnection.

Figure 17:
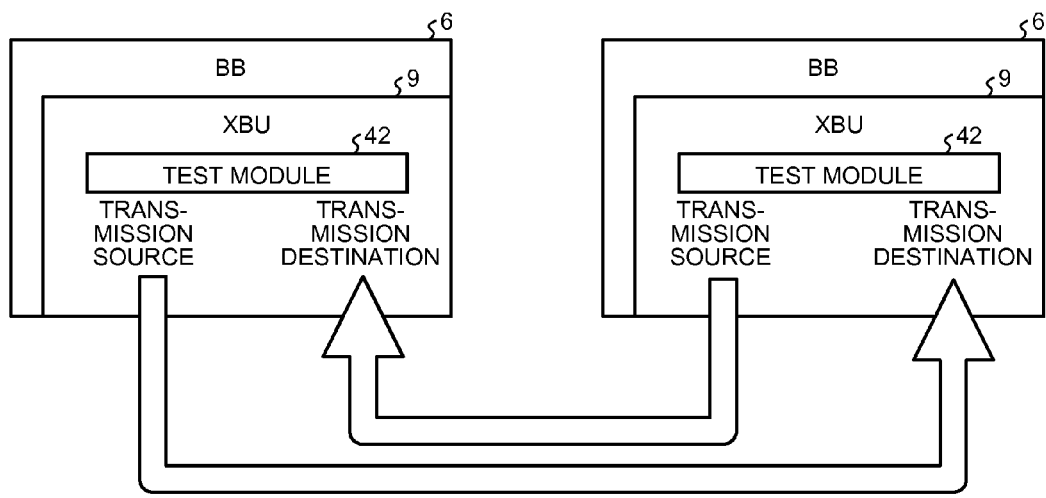
FIG. 17 is a diagram for illustrating a crossbar test.

FIG. 17 is a diagram for illustrating a crossbar test. FIG. 17 illustrates a case in which a crossbar test is performed between the building blocks 6. As illustrated in FIG. 17, the crossbar test is performed between two test modules 42. The test is started from the XBU 9 as a transmission source, and crossbar communication is performed toward the XBU 9 as a transmission destination. The XBU 9 as the transmission destination performs data analysis and return communication to the transmission source on the received crossbar communication data. As the transmission source and the transmission destination, all combination patterns of the building blocks 6 and the crossbar boxes 2 to be diagnosed are selected, and the crossbar test is bidirectionally performed on each combination pattern.

Figure 18:
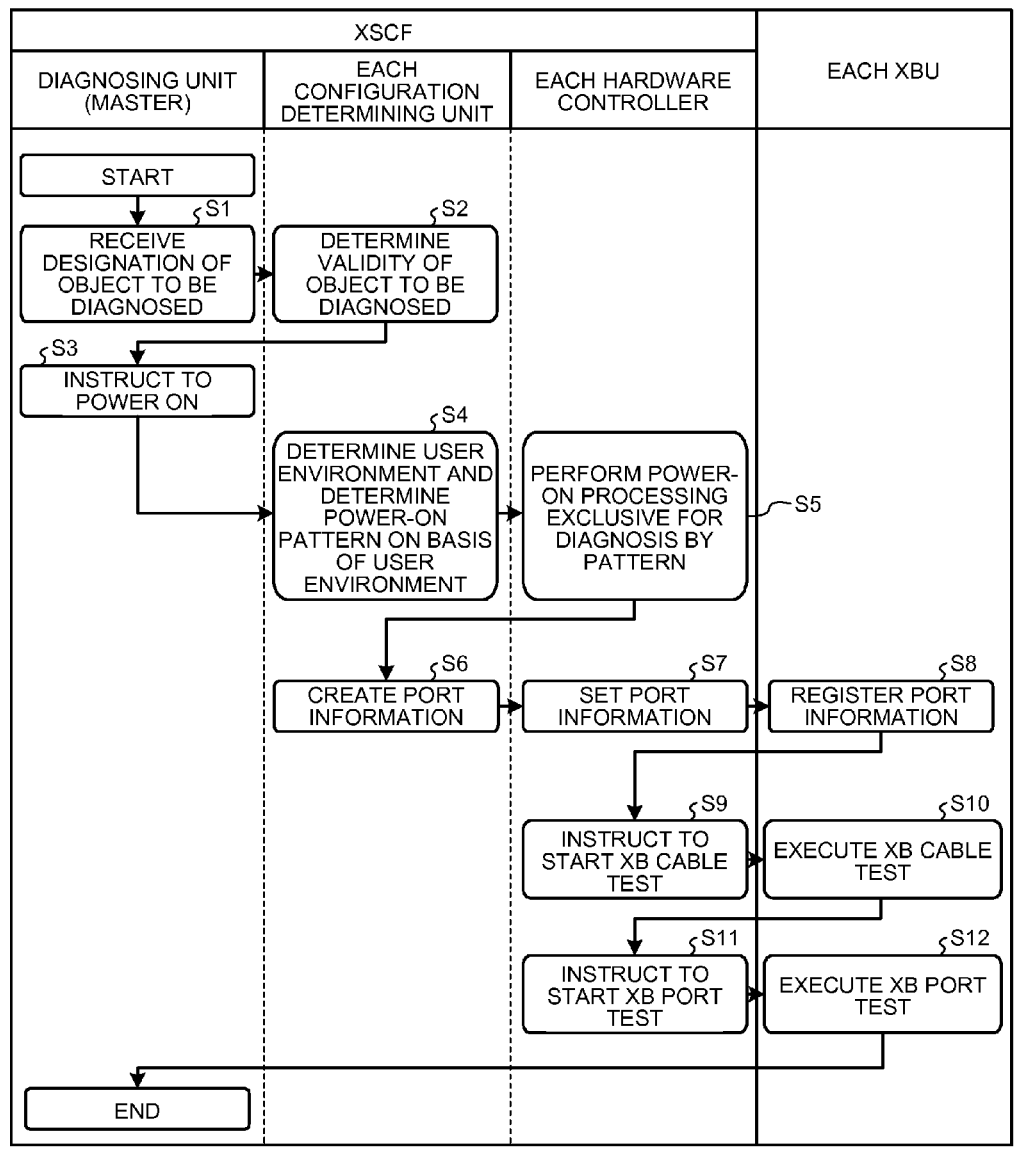
FIG. 18 is a diagram illustrating a sequence of crossbar diagnosis.

Next, a sequence of the crossbar diagnosis will be explained. FIG. 18 is a diagram illustrating the sequence of the crossbar diagnosis. As illustrated in FIG. 18, the diagnosing unit 31 of the XSCF 3 operating as the master receives designation of the crossbar box 2 and the building block 6 as objects to be diagnosed from the user terminal 10 (Step S1). The diagnosing unit 31 instructs each configuration determining unit 32 of the objects to be diagnosed to determine the validity of the object to be diagnosed, and each configuration determining unit 32 of the objects to be diagnosed determines the validity of the object to be diagnosed (Step S2).

The diagnosing unit 31 instructs each configuration determining unit 32 of the objects to be diagnosed to perform power-on exclusive for diagnosis (Step S3). The configuration determining unit 32 determines the user environment and determines the power-on pattern on the basis of the user environment (Step S4). Each hardware controller 33 performs the power-on processing exclusive for diagnosis by pattern (Step S5).

Each configuration determining unit 32 creates the port information (Step S6), and each hardware controller 33 sets the port information (Step S7). Each XBU registers the port information (Step S8).

Each hardware controller 3 instructs each XBU to start the XB cable test (Step S9), and each XBU executes the XB cable test (Step S10). Each hardware controller 33 instructs each XBU to start the XB port test (Step S11), and each XBU executes the XB port test (Step S12).

As described above, the information processing system 1 according to the present embodiment performs the crossbar diagnosis without using the CPU 81, thereby performing the crossbar diagnosis while the operation of the information processing system 1 is continued.

Figure 19:
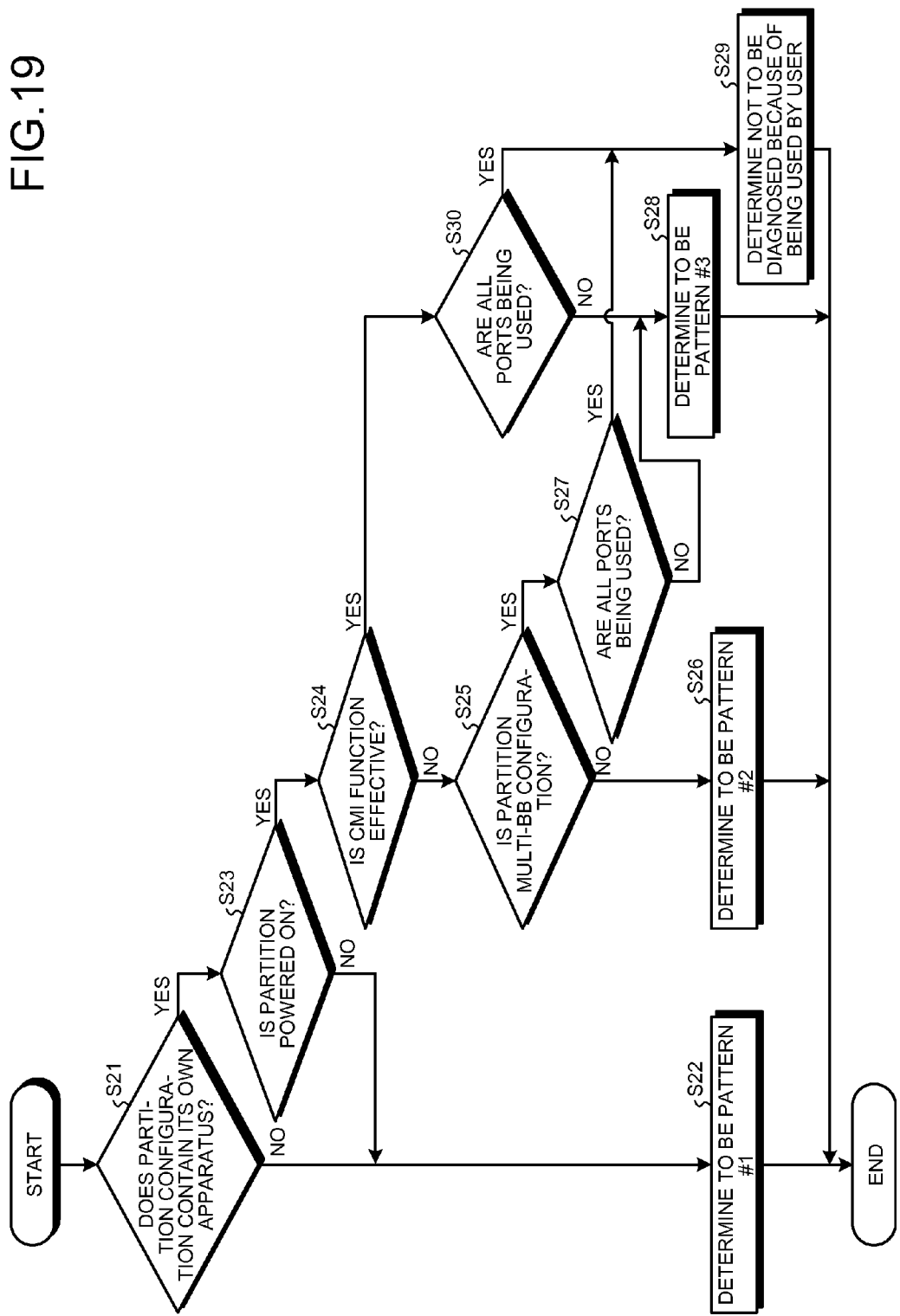
FIG. 19 is a flowchart illustrating a procedure of processing to determine a power-on pattern.

Next, a procedure of processing to determine a power-on pattern will be explained. FIG. 19 is a flowchart illustrating the procedure of the processing to determine the power-on pattern. As illustrated in FIG. 19, the environment determining unit 32b determines whether the partition configuration contains its own apparatus (Step S21). If its own apparatus is not contained, its own apparatus is in a stopped state, and the environment determining unit 32b determines the power-on pattern to be Pattern #1 (Step S22). Even when the apparatus is in a stopped state, the XSCF is operable.

If the partition configuration contains its own apparatus, the environment determining unit 32b determines whether the partition 61 containing its own apparatus is powered on (Step S23). If the partition 61 containing its own apparatus is not powered on, its own apparatus is in a stopped state, and the environment determining unit 32b determines the power-on pattern to be Pattern #1 (Step S22).

If the partition 61 containing its own apparatus is powered on, the environment determining unit 32b determines whether the CMI function is effective (Step S24), and if the CMI function is not effective, the environment determining unit 32b determines whether the partition 61 is a multi-BB configuration (Step S25). If the partition 61 is not the multi-BB configuration, the crossbar communication is not performed, the XBU is in a stopped state, and the environment determining unit 32b determines the power-on pattern to be Pattern #2 (Step S26).

If the partition 61 is the multi-BB configuration, the environment determining unit 32b determines whether all ports 43 are being used (Step S27), and if there is any port 43 that is not being used, the environment determining unit 32b determines the power-on pattern to be Pattern #3 (Step S28). If all ports 43 are being used, the environment determining unit 32b determines that its own apparatus is being used by a user and is not to be diagnosed (Step S29).

If it is determined at Step S24 that the CMI function is effective, the environment determining unit 32b determines whether all ports 43 are being used (Step S30), and if there is any port 43 that is not being used, the environment determining unit 32b determines the power-on pattern to be Pattern #3 (Step S28). If all ports 43 are being used, the environment determining unit 32b determines that its own apparatus is being used by a user and is not to be diagnosed (Step S29).

As described above, the environment determining unit 32*b* identifies a range that is not used by a user as the diagnosis range and determines the power-on pattern exclusive for diagnosis, thereby enabling the XSCF to perform the crossbar diagnosis without affecting a user's use environment.

Next, determination examples of the power-on pattern will be explained with reference to FIG. 20 to FIG. 25. In FIG. 20 to FIG. 23, a case of a building block configuration by four building blocks 6 will be explained. Each of the building blocks 6 includes two XBUs 9 and is connected to all the other building blocks 6 in a duplicated manner. In FIG. 24 and FIG. 25, a case of a crossbar box configuration by two crossbar boxes 2 and five building blocks 6 will be explained. Each of the building blocks 6 includes two XBUs 9 and is connected to two crossbar boxes 2. Each XBU 9 includes one port 43.

Figure 20:
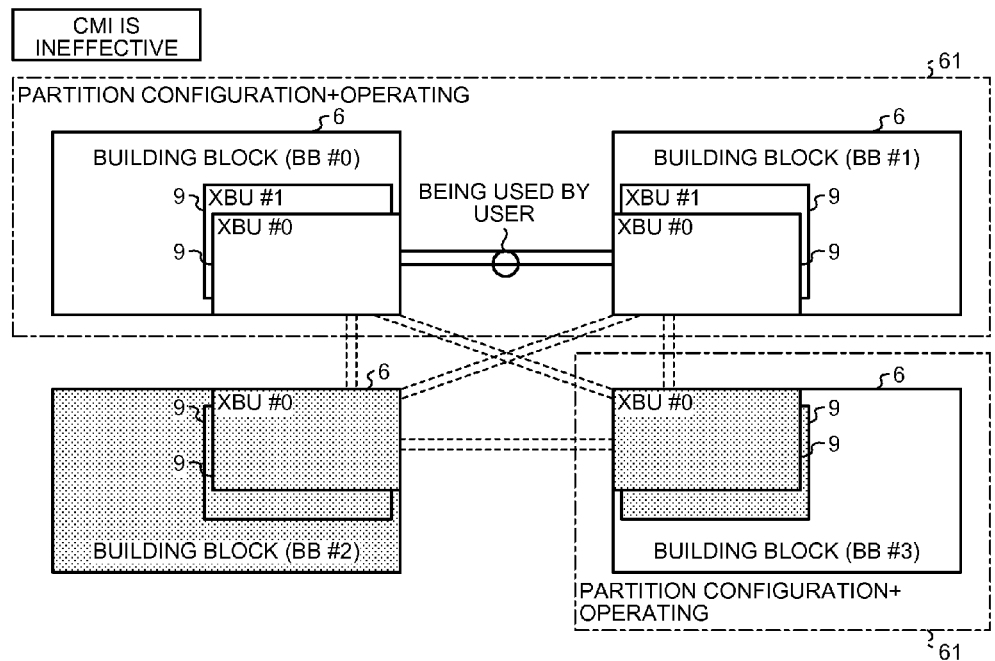
FIG. 20 is a diagram illustrating a determination example #1 of the power-on pattern.

FIG. 20 is a diagram illustrating a determination example #1 of the power-on pattern. In FIG. 20, BB #0, BB #1, and BB #3 are operating, whereas BB #2 is stopped. BB #0 and BB #1 constitute one partition 61, whereas. BB #3 singly constitutes a partition 61. The CMI function is assumed to be ineffective. Consequently, only crossbar communication of BB #0 and BB #1 is in a state being used by a user.

In this case, as listed in the table of FIG. 20, in BB #0 and BB #1, the BB 6 and the XBU 9 are operating, whereas a partial XB port is stopped. The XB port is the port 43 of the XBU. Consequently, the environment determining units 32*b* of BB #0 and BB #1 determine the power-on pattern to be Pattern #3. BB #2 is stopped. Consequently, the environment determining unit 32*b* of BB #2 determines the power-on pattern to be Pattern 41. In BB #3, the BB 6 is operating, whereas the XBU 9 is stopped. Consequently, the environment determining unit 32*b* of BB #3 determines the power-on pattern to be Pattern #2.

Figure 21:
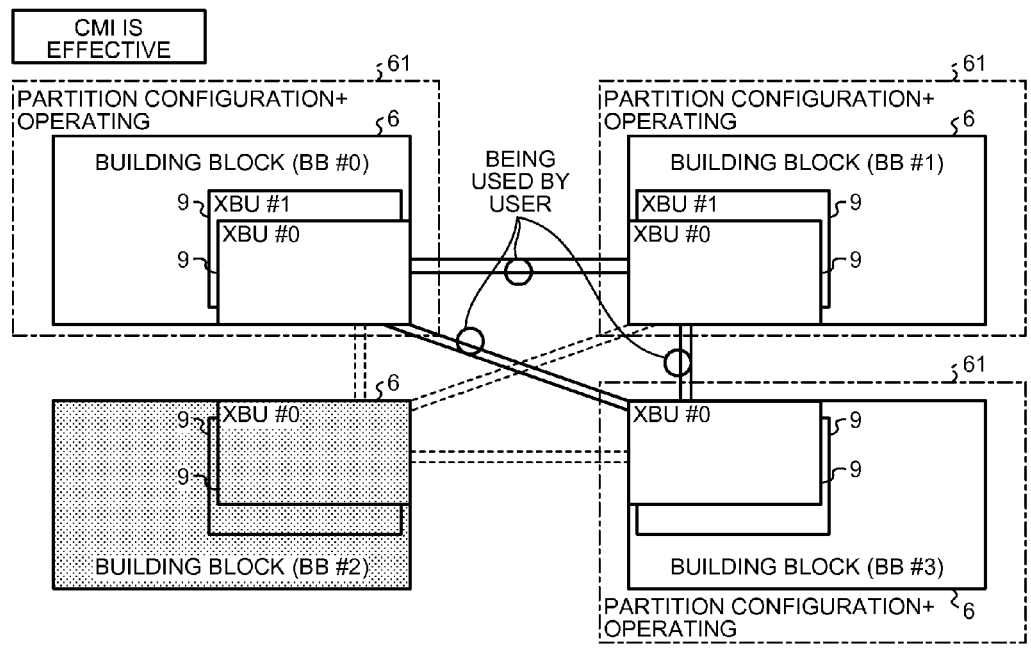
FIG. 21 is a diagram illustrating a determination example #2 of the power-on pattern.

FIG. 21 is a diagram illustrating a determination example #2 of the power-on pattern. In FIG. 21, BB #0, BB #1, and BB #3 are operating, whereas BB #2 is stopped. BB #0, BB #1, and BB #3 each singly constitute a partition 61. The CMI function is assumed to be effective. Consequently, pieces of crossbar communication of BB #0 and BB #1, BB #0 and BB #3, and BB #1 and BB #3 are in a state being used by a user.

In this case, as listed in the table of FIG. 21, in BB #0, BB #1, and BB #3, the CC 6 and the XBU 9 are operating, whereas a partial XB port is stopped. Consequently, the environment determining units 32*b* of BB #0, BB #1, and BB #3 determine the power-on pattern to be Pattern 43. BB #2 is stopped. Consequently, the environment, determining unit 32*b* of BB #2 determines the power-on pattern to be Pattern #1.

FIG. 22 is a diagram illustrating a determination example #3 of the power-on pattern. In FIG. 22, BB #0, BB #1, and BB #3 are operating, whereas BB #2 is stopped. BB #0 and BB #1 constitute one partition 61, whereas BB #3 singly constitutes a partition 61. In BB #0 and BB #1, one XBU 9 (XBU #1) is stopped. The CMI function is assumed to be ineffective. Consequently, only one crossbar communication of BB #0 and BB #1 is in a state being used by a user.

In this case, as listed in the table of FIG. 22, in BS #0 and BB #1, the BS 6 and XBU #0 are operating, whereas XBU #1 is stopped. In XBU #0, a partial XB port is stopped. Consequently, the environment determining units 32*b* of BB #0 and BB #1 determine the power-on pattern to be Pattern 42 for XBU #1 and determine the power-on pattern to be Pattern #3 for XBU #0. BB #2 is stopped. Consequently, the environment determining unit 32*b* of BB #2 determines the power-on pattern to be Pattern #1. In BB #3, the BB 6 is operating, whereas the XBU 9 is stopped. Consequently, the environment determining unit 32*b* of BB #3 determines the power-on pattern to be Pattern 42.

FIG. 23 is a diagram illustrating a determination example #4 of the power-on pattern. In FIG. 23, BB #0, BB #1, and BB #3 are operating, whereas BB #2 is stopped. BB #0, BB #1, and BB #3 each singly constitute a partition 61. In BB #0, BB #1, and BB #3, one XBU 9 (XBU #1) is stopped. The CMI function is assumed to be effective. Consequently, pieces of crossbar communication of one of BB #0 and BB #1, one of BB #0 and BB #3, and one of BB #1 and BB #3 are in a state being used by a user.

In this case, as listed in the table of FIG. 23, in BB #0, BB #1, and BB #3, the BB 6 and XBU #0 are operating, whereas XBU #1 is stopped. In XBU #0, a partial XB port is stopped. Consequently, the environment determining units 32*b* of BB #0, BB #1, and BB #3 determine the power-on pattern to be Pattern #2 for XBU #1 and determine the power-on pattern to be Pattern #3 for XBU #0. BB #2 is stopped. Consequently, the environment determining unit 32*b* of BB #2 determines the power-on pattern to be Pattern #1.

FIG. 24 is a diagram illustrating a determination example #5 of the power-on pattern. In FIG. 24, XBBOX #80 is operating, whereas XBBOX #81 is stepped. BB #0 and BB #1 are operating, whereas BB #2 to BB #4 are stopped. XBUs #0 of BB #0 and BB #1 are operating, whereas XBUs #1 of BB #0 and BB #1 are stopped. BB #0 and BB #1 constitute a partition 61. The CMI function is assumed to be ineffective. Consequently, crossbar communication of XBU #0 of BB #0 and the XBU 4 of XBBOX #80 and crossbar communication of XBU #0 of BB #1 and the XBU 4 of XBBOX #80 are in a state being used by a user.

In this case, as listed in the table of FIG. 24, in XBBOX #80, an XBBOX 2 and the XBU 4 are operating, whereas a partial XB port is stopped. Consequently, the environment determining unit 32*b* of XBBOX #80 determines the power-on pattern to be Pattern 43. XBBOX 481 is stopped. Consequently, the environment determining unit 32*b* of XBBOX #81 determines the power-on pattern to be Pattern #1.

In BB #0 and BB #1, the BB 6 and XBU #0 are operating, whereas XBU #1 is stopped. In XBU #0, all XB ports are operating. Consequently, the environment determining units 32*b* of BB #0 and BB #1 determine the power-on pattern to be Pattern #2 for XBU #1 and determine not to be diagnosed for XBU #0. BB #2 to BB #4 are stopped. Consequently, the environment determining units 32*b* of BB #2 to BB #4 determine the power-on pattern to be Pattern #1.

FIG. 25 is a diagram illustrating a determination example #6 of the power-on pattern. In FIG. 25, XBBOX #80 and XBBOX 481 are operating. BB #0 and BB #1 are operating, whereas BB #2 to BB #4 are stopped. XBUs #0 of BB #0 and BB #1 are operating, and XBUs #1 of BB #0 and BB #1 are also operating. BB #0 and BB #1 each singly constitute a partition 61. The CMI function is assumed to be effective. Consequently, crossbar communication of XBU #0 of BB #0 and the XBU 4 of XBBOX #80 and crossbar communication of XBU #0 of BB #1 and the XBU 4 of XBBOX #80 are in a state being used by a user. In addition, crossbar communication of XBU #1 of BB #0 and the XBU 4 of XBBOX #81 and crossbar communication of XBU 41 of BB #1 and the XBU 4 of XBBOX #81 are in a state being used by a user.

In this case, as listed in the table of FIG. 25, in XBBOX #80 and XBBOX #81, the XBBOX 2 and the XBU 4 are operating, whereas a partial XB port is stopped. Consequently, the environment determining units 32b of XBBOX #80 and XBBOX #81 determine the power-on pattern to be Pattern #3.

In BB #0 and BB #1, the BB 6 and the XBU 9 are operating, and all XB ports are operating. Consequently, the environment determining units 32b of BB #0 and BB #1 determine the BB 6 not to be diagnosed. BB #2 to BB #4 are stopped. Consequently, the environment determining units 32b of BB #2 to BB #4 determine the power-on pattern to be Pattern #1.

Figure 26:
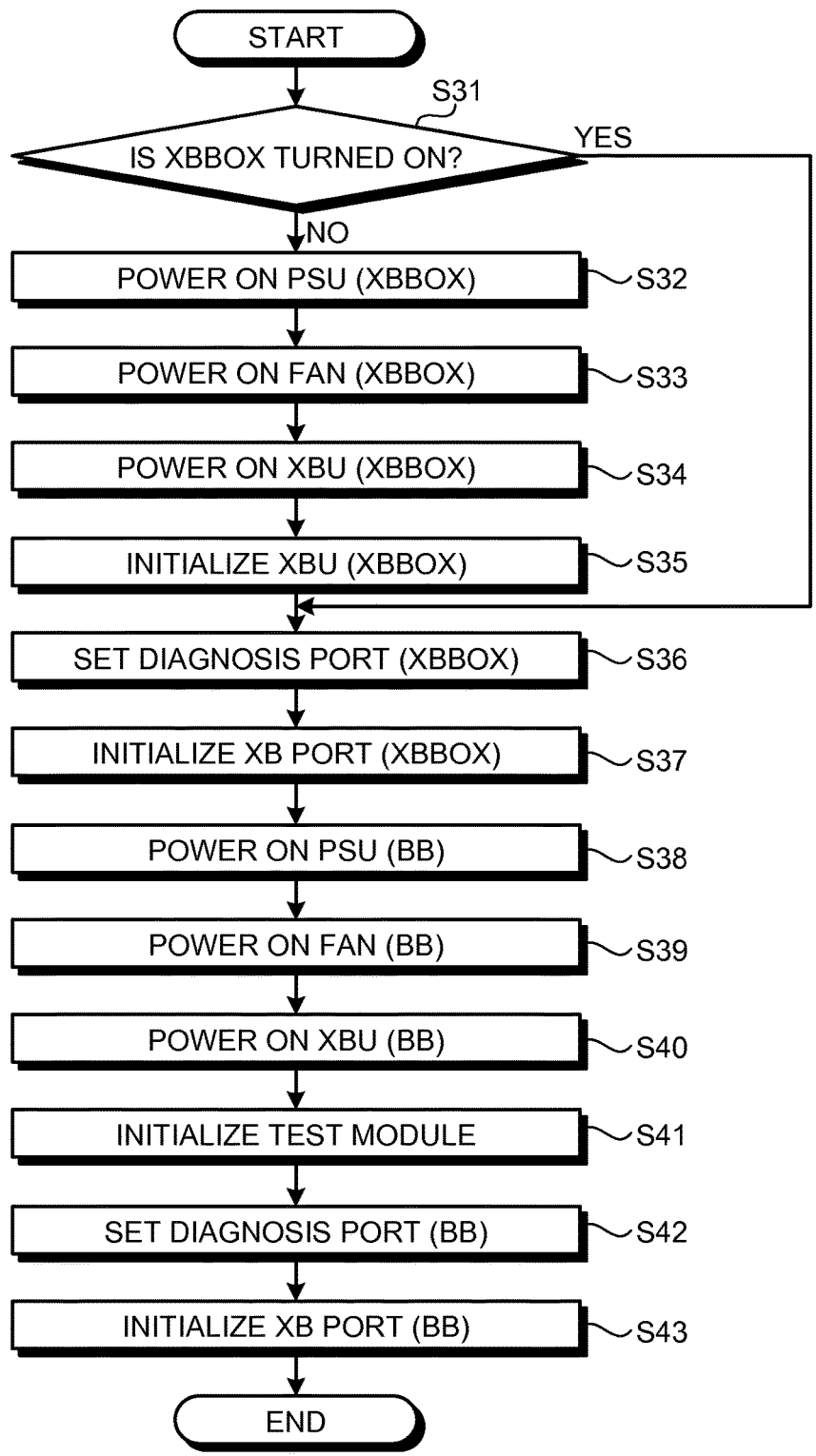
FIG. 26 is a flowchart illustrating a procedure of power-on processing exclusive for diagnosis in the case of Pattern #1.
Figure 27:
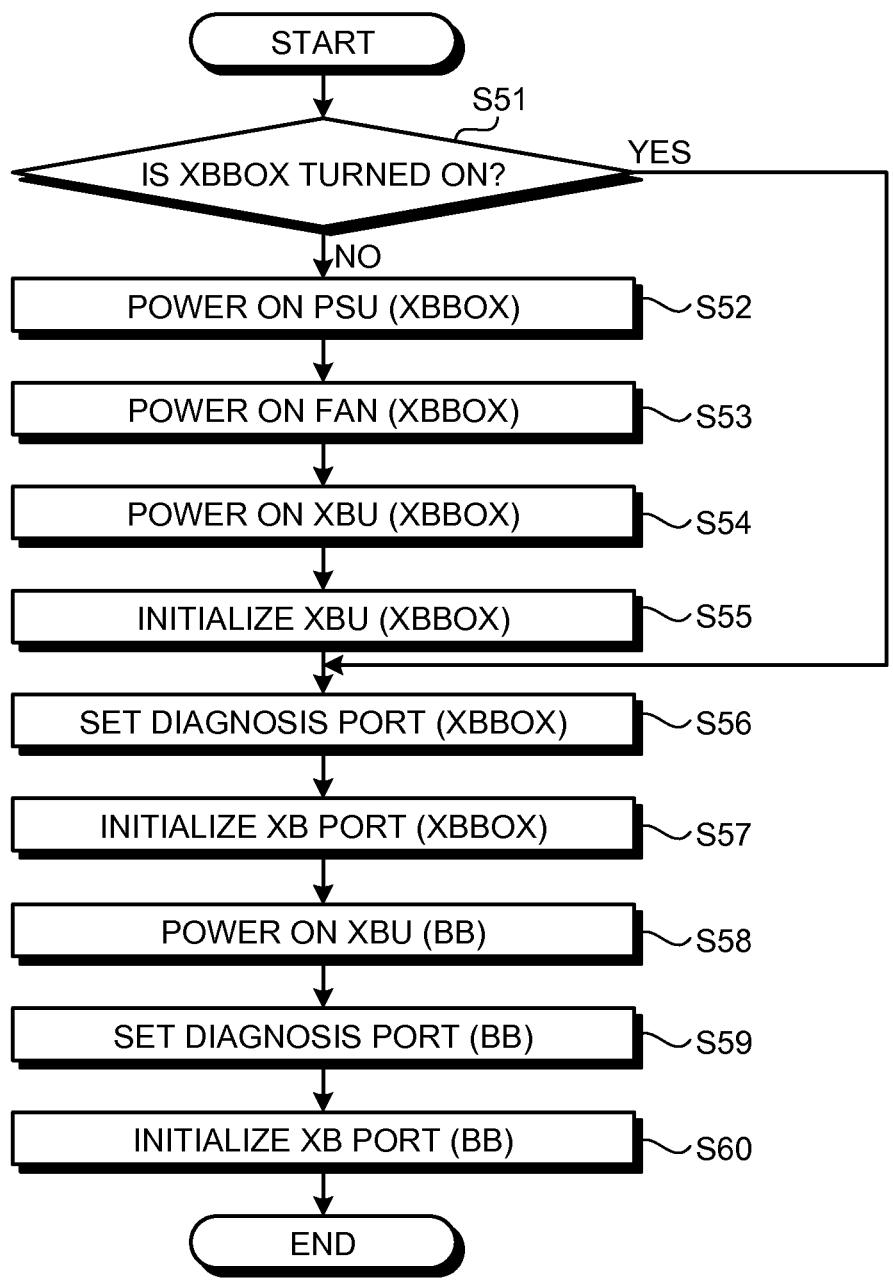
FIG. 27 is a flowchart illustrating a procedure of the power-on processing exclusive for diagnosis in the case of Pattern #2.
Figure 28:
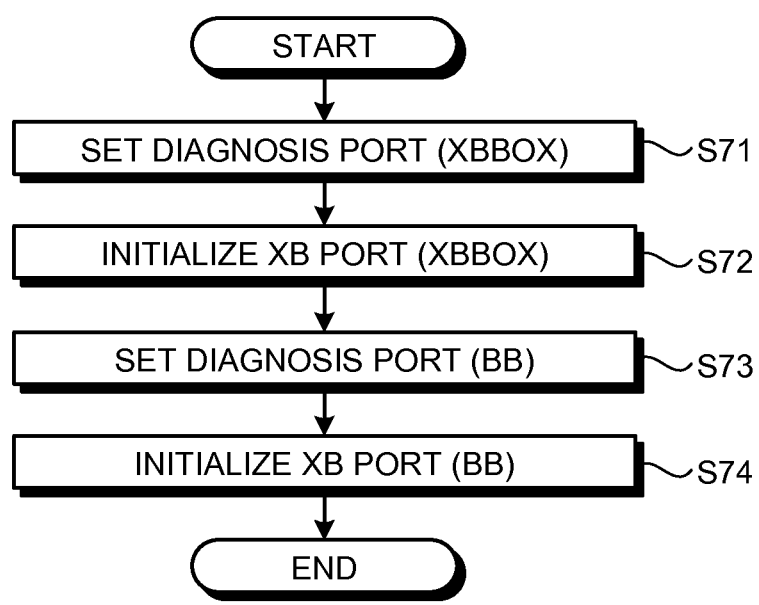
FIG. 28 is a flowchart illustrating a procedure of the power-on processing exclusive for diagnosis in the case of Pattern #3.

Next, a procedure of the power-on processing exclusive for diagnosis will be explained with reference to FIG. 26 to FIG. 28. Here, processing of the diagnosis power-on unit 33a of the BB 6 will be explained. In FIG. 26 to FIG. 28, "PSU (XBBOX)" or the like indicates an operation by the XBBOX 2 on a PSU or the like of the XBBOX 2, and "PSU (BB)" or the like indicates an operation by the BB 6 on the PSU or the like of the BB 6. The PSU is a power supply unit, and a FAN is a fan.

FIG. 26 is a flowchart illustrating a procedure of the power-on processing exclusive for diagnosis in the case of Pattern #1. The BB 6 to be subjected to Pattern #1 is a BB 6 that is not incorporated into the partition 61, a BB 6 the partition 61 of which is shut off, or a BB 6 that is separate from the partition 61 due to a failure or dynamic reconstruction.

As illustrated in FIG. 26, the diagnosis power-on unit 33a of the BB 6 determines whether the XBBOX 2 is turned on (Step S31), and if the XBBOX 2 is turned on, the process advances to Step S36. If the XBBOX 2 is not turned on, the diagnosis power-on unit 33a of the BB 6 instructs the diagnosis power-on unit 33a of the XBBOX 2 to power on, and the diagnosis power-on unit 33a of the XBBOX 2 powers on the PSU (Step S32).

The diagnosis power-on unit 33a of the XBBOX 2 powers on the FAN (Step S33) and powers on the XBU 4 (Step S34). The diagnosis power-on unit 33a of the XBBOX 2 initializes the XBU 4 (Step S35).

The diagnosis power-on unit 33a of the XBBOX 2 sets the diagnosis port as the port type in the port information storage unit 41 (Step S36) and initializes the XB port (Step S37).

The diagnosis power-on unit 33a of the BB 6 powers on the PSU (Step S38) and powers on the PAN (Step S39). The diagnosis power-on unit 33a of the BB 6 powers on the XBU 9 (Step S40) and initializes the test module 42 (Step S41). The diagnosis power-on unit 33a of the BB 6 sets the diagnosis port as the port type in the port information storage unit 41 (Step S42) and initializes the XB port (Step S43).

FIG. 27 is a flowchart illustrating a procedure of the power-on processing exclusive for diagnosis in the case of Pattern #2. The BB 6 to be subjected to Pattern #2 is a BB 6 that is operating incorporated into the partition 61 and that the partition 61 of which is one-building block configuration or one XBU 9 of redundant ones of which is stopped, that is, the XBU 9 of which is one-side stopped.

As illustrated in FIG. 27, the diagnosis power-on unit 33a of the BB 6 determines whether the XBBOX 2 is turned on (Step S51), and if the XBBOX 2 is turned on, the process advances to Step S56. If the XBBOX 2 is not turned on, the diagnosis power-on unit 33a of the BS 6 instructs the diagnosis power-on unit 33a of the XBBOX 2 to power on, and the diagnosis power-on unit 33a of the XBBOX 2 powers on the PSU (Step S52).

The diagnosis power-on unit 33a of the XBBOX 2 powers on the FAN (Step S53) and powers on the XBU 4 (Step S54). The diagnosis power-on unit 33a of the XBBOX 2 initializes the XBU 4 (Step S55).

The diagnosis power-on unit 33a of the XBBOX 2 sets the diagnosis port as the port type in the port information storage unit 41 (Step S56) and initializes the XB port (Step S57).

The diagnosis power-on unit 33a of the BB 6 powers on the XBU 9 (Step S58), sets the diagnosis port as the port type in the port information storage unit 41 (Step S59), and initializes the XB port (Step S60).

FIG. 28 is a flowchart illustrating a procedure of the power on processing exclusive for diagnosis in the case of Pattern #3. The BB 6 to be subjected to Pattern #3 is a BB 6 that is operating incorporated into the partition 61, the partition 61 of which is a multiple-building block configuration, and a partial port 43 of the operating XBU 9 of which is stopped.

As illustrated in FIG. 28, the diagnosis power-on unit 33a of the BB 6 instructs the diagnosis power-on unit 33a of the XBBOX 2 to set the port information, and the diagnosis power-on unit 33a of the XBBOX 2 sets the diagnosis port as the port type in the port information storage unit 41 (Step S71) and initializes the XB port (Step S72).

The diagnosis power-on unit 33a of the BB 6 sets the diagnosis port as the port type in the port information storage unit 41 of the stopped XB port (Step S73) and initializes the XB port (Step S74).

As described above, the diagnosis power-on unit 33a powers on an object to be diagnosed on the basis of the power-on pattern, thereby enabling the information processing system 1 to perform the crossbar diagnosis for the apparatus that is not being used by a user.

Next, setting examples of the port information will be explained with reference to FIG. 29 to FIG. 32. FIG. 29 to FIG. 32 are diagrams illustrating setting examples #1 to #4 of the port information. In FIG. 29 and FIG. 30, a case of a building block configuration by four building blocks 6 will be explained. Each of the building blocks 6 includes two XBUs 9 and is connected to all the other building blocks 6 in a duplicated manner.

In FIG. 31 and FIG. 32, a case of a crossbar box configuration by two crossbar boxes 2 and five building blocks 6 will be explained. Each of the building blocks 5 includes two XBUs 9 and is connected to two crossbar boxes 2. Each of the XBUs 9 includes one port 43.

In the tables of FIG. 29 to FIG. 32, the BBID is a number identifying the building block 6 or the crossbar box 2. The connection destination BBID is the number of the building block 6 or the crossbar box 2 as a connection destination. "x/y" represents a setting value of XBU #0/a setting value of XBU #1. The number of the XBU as a connection destination is set to the same as the number of the XBU as a connection source.

In FIG. 29, BB #0, BB #1, and BB #3 are operating, whereas BB #2 is stopped. BB #0, BB #1, and BB #3 constitute one partition 61. The CMI function is assumed to be ineffective. Consequently, crossbar communication of BB #0 and BB #1, crossbar communication of BB #0 and BB 3#, and crossbar communication of BB #1 and BB #3 are in a state being used by a user.

In this case, as listed in the table of FIG. 29, among the ports 43 of BB #0, BB #1, and BB #3, the port types of the ports 43 connected to BB #2 are set as the diagnosis port/the diagnosis port. For example, Port #1 of BB #0 is connected to BB #2 and is not being used by a user, and the port type is set as the diagnosis port/the diagnosis port. BB #2 is stopped, and the port types of all Ports #0 to #2 are set as the diagnosis port/the diagnosis port.

In FIG. 30, BB #0, BB #1, and BB #3 are operating, whereas BB #2 is stopped. XBUs #0 of BB #0, BB #1, and BB #3 are operating, whereas XBUs 41 of BB #0, BB #1, and BB #3 are stopped. BB #0, BB #1, and BB #3 each singly constitute a partition 61. The CMI function is assumed to be effective. Consequently, one of crossbar communication of BB #0 and BB #1, one of crossbar communication of BB #0 and BB #3, and one of crossbar communication of BB #1 and BB #3 are in a state being used by a user.

In this case, as listed in the table of FIG. 30, among the ports of BB #0, BB #1, and BB #3, the port types of the ports connected to BB #2 are set as the diagnosis port/the diagnosis port, whereas the port types of XBU #1 of the ports connected to the other BB 6 are set as the diagnosis port. For example, Port #0 of BB #0 is connected to BB #1, XBU #1 is not being used by a user, and the port type is set as the diagnosis port. BB #2 is stopped, and the port types of all Ports #0 to #2 are set as the diagnosis port/the diagnosis port.

In FIG. 31, XBBOX #80 is operating, whereas XBBOX 481 is stopped. BB #0 and BB #1 are operating, whereas BB #2 to BB #4 are stopped. XBUs #0 of BB #0 and BB #1 are operating, whereas XBUs #1 of BB #0 and BB #1 are stopped. BB #0 to BB #4 are connected to Port #0 to Port #4 of XBBOX #80 and XBBOX #81, respectively. BB #0 and BB #1 constitute a partition 61. The CMI function is assumed to be ineffective. Consequently, crossbar communication of XBU #0 of BB #0 and the XBU 4 of XBBOX #80 and crossbar communication of XBU #0 of BB #1 and the XBU 4 of XBBOX #80 are in a state being used by a user.

In this case, as listed in the table of FIG. 31, Port #2 to Port #4 of XBBOX #80 are set as the diagnosis port, whereas all ports of XBBOX #81 are set as the diagnosis port. Ports #0 of BB #0 and BB #1 are set as the normal port/the diagnosis port, whereas Ports #0 of B #2 to BB #4 are set as the diagnosis port/the diagnosis port.

In FIG. 32, XBBOX #80 and XBBOX #81 are operating. BB #0 and BB #1 are operating, whereas BB #2 to BB #4 are stopped. XBUs #0 of BB #0 and BB #1 are operating, and XBUs #1 of BB #0 and BB #1 are also operating. BB #0 to BB #4, are connected to Port #0 to Port #4 of XBBOX #80 and XBBOX #81, respectively. BB #0 and BB #1 each singly constitute a partition 61. The CMI function is assumed to be effective. Consequently, crossbar communication of XBU #0 of BB #0 and the XBU 4 of XBBOX #80 and crossbar communication of XBU #0 of BB #1 and the XBU 4 of XBBOX #0 are in a state being used by a user. In addition, crossbar communication of XBU #1 of BB #0 and the XBU 4 of XBBOX #81 and crossbar communication of XBU #1 of BB #1 and the XBU 4 of XBBOX #81 are in a state being used by a user.

In this case, as listed in the table of FIG. 32, Port #2 to Port #4 of XBBOX #80 and XBBOX #81 are set as the diagnosis port. Ports #0 of BB #2 to BB #4 are set as the diagnosis port/the diagnosis port.

Figure 33:
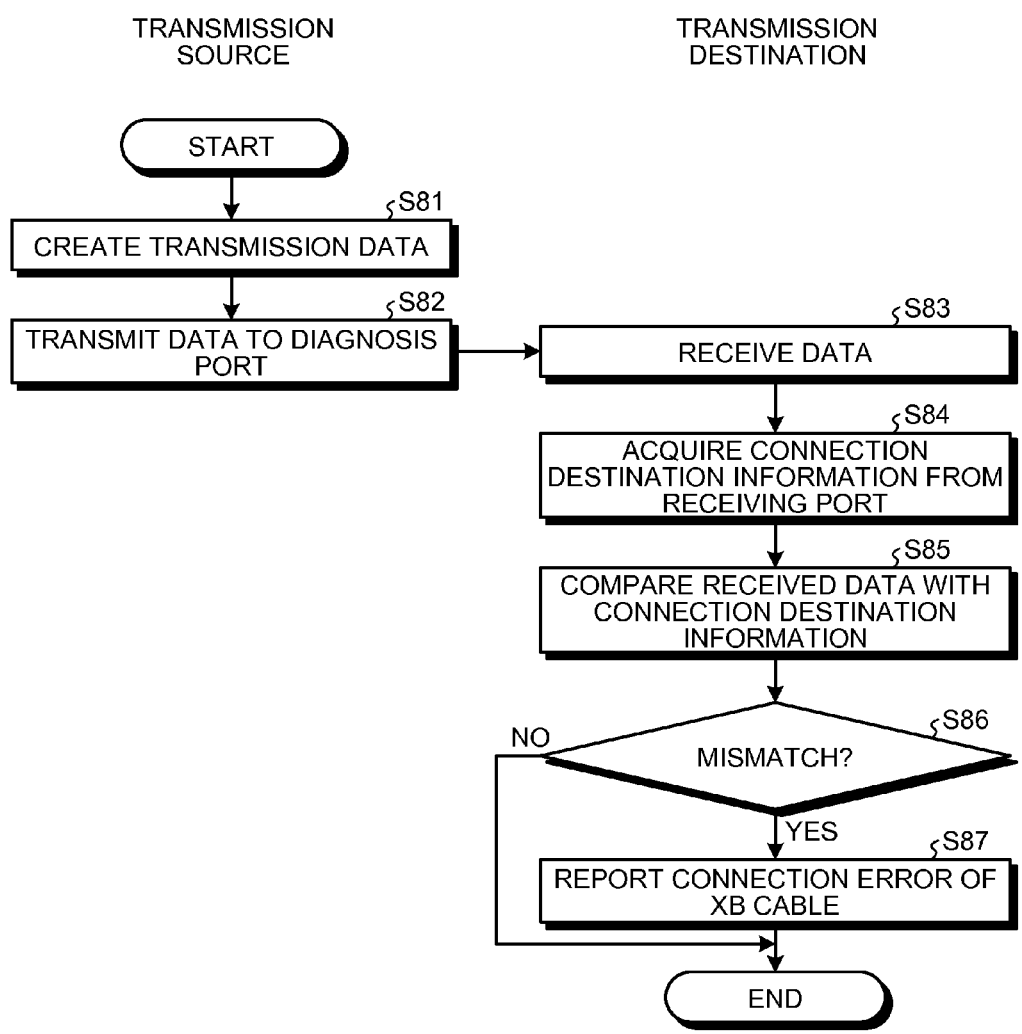
FIG. 33 is a flowchart illustrating a processing procedure of an XB cable test.

Next, a processing procedure of the XB cable test will be explained. FIG. 33 is a flowchart illustrating the processing procedure of the XB cable test. As illustrated in FIG. 33, the XB cable test unit 42a as a transmission source creates transmission data (Step S81) and transmits the data to the diagnosis port as the transmission destination (Step S82). The transmission data contains the BBID, the XBU number, and the port number.

The XB cable test unit 42a as the transmission destination receives the data via the port 43 (Step S83). The XB cable test unit 42a as the transmission destination acquires the connection destination information from a receiving port 43 that has received the data (Step S84) and compares the received data with the connection destination information (Step S85).

The XB cable test unit 42a as the transmission destination determines whether the received data and the connection destination information do not match (Step S86), and if they do not match, reports a connection error of the XB cable 20 to the XSCF (Step S87).

As described above, the XB cable test unit 42a performs the XB cable test, thereby performing the crossbar diagnosis without using the CPU 81 and the memory 82.

Figure 34:
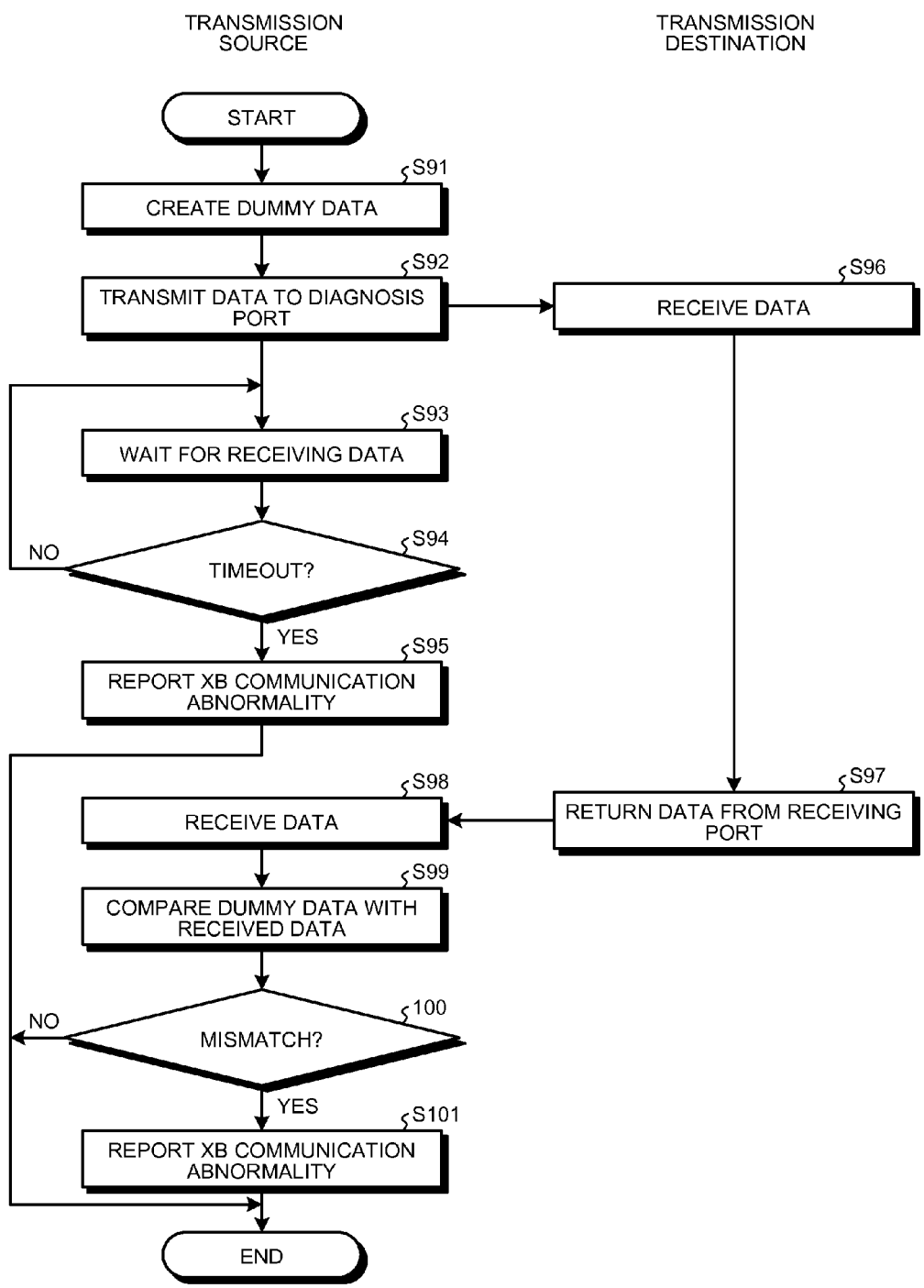
FIG. 34 is a flowchart illustrating a processing procedure of an XB port test.

Next, a processing procedure of the XB port test will be explained. FIG. 34 is a flowchart illustrating the processing procedure of the XB port test. As illustrated in FIG. 34, the XB port test unit 42b as a transmission source creates dummy data (Step S91) and transmits the data to the diagnosis port as the transmission destination (Step S92). As the dummy data, a hexadecimal number of 0x55555555 is used, for example.

The XB port test unit 42b as the transmission source waits for receiving the data (Step S93) and determines whether it is timeout (Step S94). The XB port test unit 42b as the transmission source returns the process to Step S93 if it is not timeout. The XB port test unit 42b reports an abnormality in the XB communication to the XSCF if it is timeout (Step S95).

The XB port test unit 42b as the transmission destination receives the data (Step S96) and then returns the data from the receiving port (Step S97). The XB port test unit 42b as the transmission source receives the returned data (Step S98) and compares the dummy data with the received data (Step S99).

The XB port test unit 42b as the transmission source determines whether the dummy data and the reception data do not match (Step S100), and if both do not match, reports an abnormality in the XB communication to the XSCF (Step S101).

As described above, the XB port test unit 42b performs the XB port test, thereby performing the crossbar diagnosis without using the CPU 81 and the memory 82.

Figure 35:
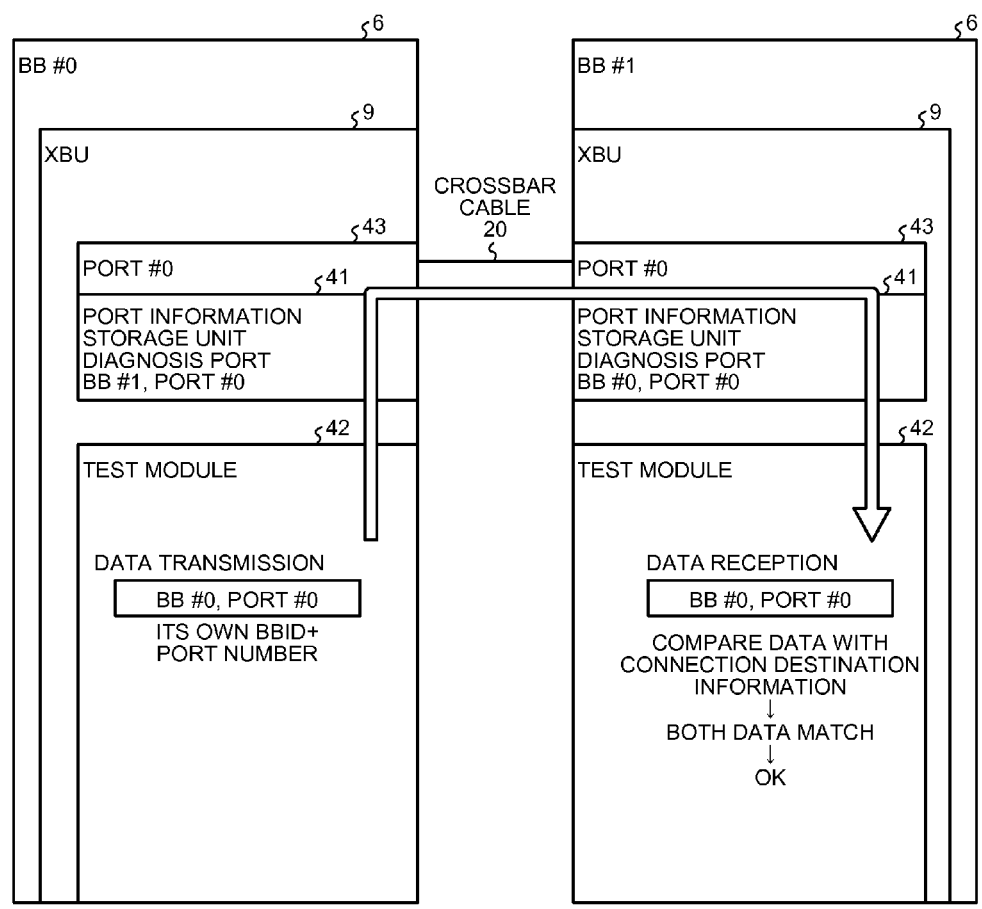
FIG. 35 is a diagram illustrating an example (normal) or the XB cable test.
Figure 36:
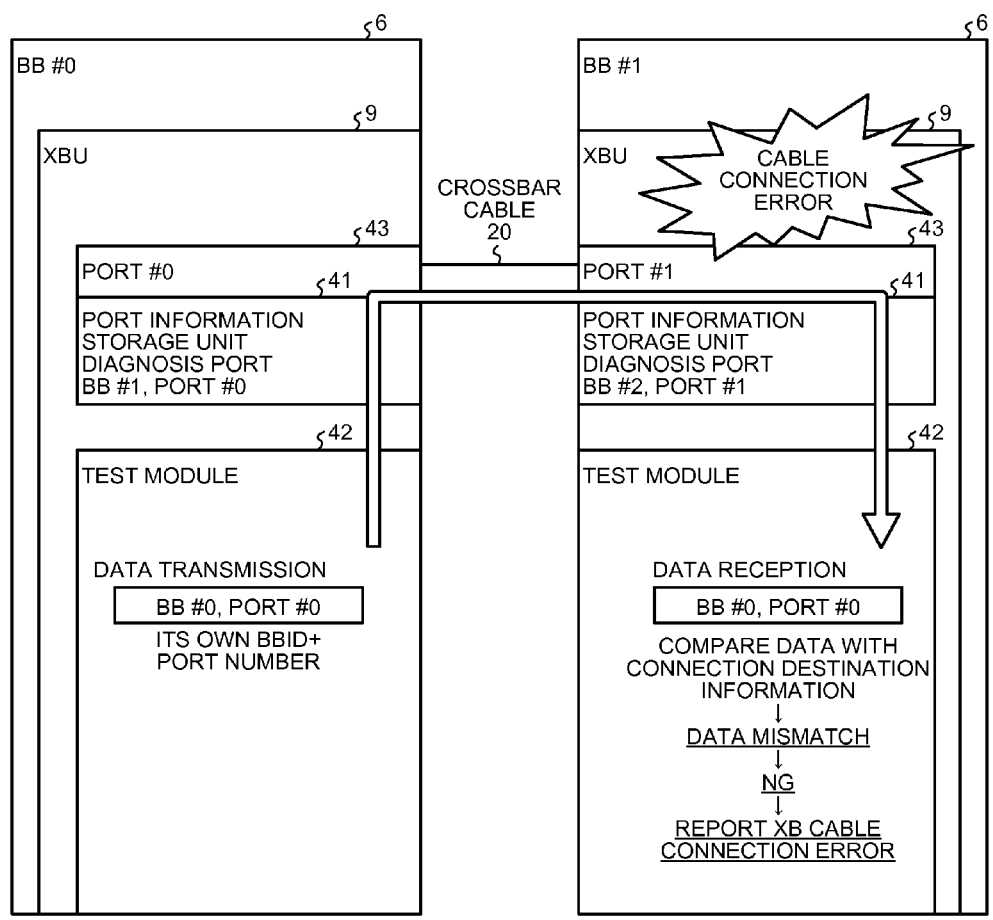
FIG. 36 is a diagram illustrating an example (error detection) of the XB cable test.
Figure 37:
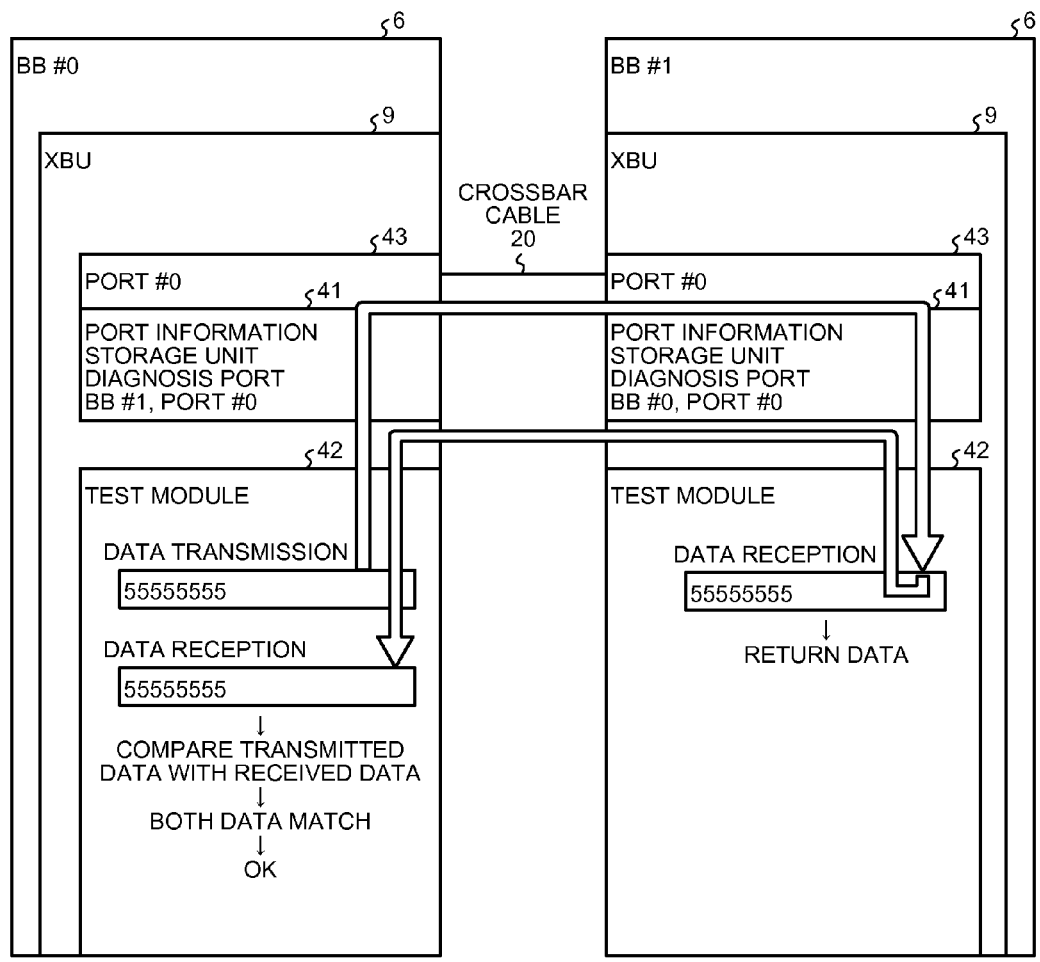
FIG. 37 is a diagram illustrating an example (normal) of the XB port test.
Figure 38:
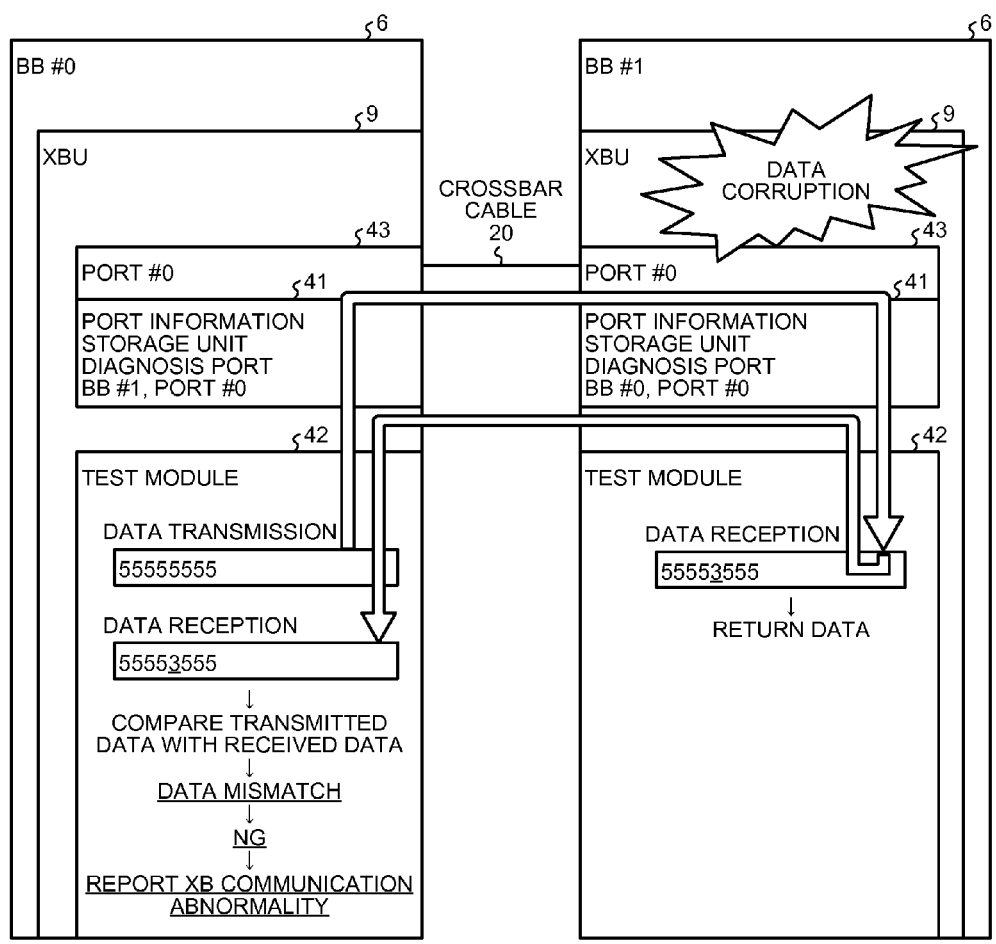
FIG. 38 is a diagram illustrating an example (error detection) of the XB port test.

Next, examples of the crossbar diagnosis will be explained with reference to FIG. 35 to FIG. 38. FIG. 35 and FIG. 36 are examples of the XB cable test for a normal case and a case of error detection, respectively. FIG. 37 and FIG. 38 are examples of the XB port test for a normal case and a case of error detection, respectively.

In FIG. 35, FIG. 37, and FIG. 38, Port #0 of the XBU 9 of BB #0 and Port #0 of the XBU 9 of BB #1 are correctly connected to each other with the cable 20. In FIG. 36, in contrast, Port #0 of the XBU 9 of BB #0 and Port #1 of the XBU 9 of BB #1 are erroneously connected to each other with the cable 20. The port information storage unit 41 of Port #0 of BB #0 stores therein BB #1 and Port #0 as a connection destination, whereas the port information storage unit 41 of Port #0 of BB #1 stores therein BB #0 and Port #0 as a connection destination. FIG. 35 to FIG. 38 illustrate a case in which the building block 6 includes one XBU 9, in which the XBU number as the connection destination is omitted.

As illustrated in FIG. 35, the test module 42 of BB #0 creates transmission data on the basis of BB #0 and Port #0 as information for identifying the port of its own apparatus and transmits the transmission data to Port #0 of BB #1. The test module 42 of BB #1 compares the data received by Port #0 with the connection destination of Port #0. In this case, both match, and the test module 42 of BB #1 determines the test result to be OK.

As illustrated in FIG. 36, in contrast, when the crossbar cable 20 is erroneously connected to Port #1 of BB #1, the data received by Port #1 of the test module 42 of BB #1 and the connection destination of Port #1 compared with each other do not match. Consequently, the test module 42 of BB #1 reports an XB cable connection error.

As illustrated in FIG. 37, the test module 42 of BB #0 transmits the dummy data 0x55555555 to the test module 42 of BB #1, and the test module 42 of BB #1 returns the data. The test module 42 of BB #0 compares the transmitted data with the received data. In this case, both match, and the test module 42 of BB #0 determines the test result to be OK.

As illustrated in FIG. 38, when data corruption occurs in the data transmitted by the test module 42 of BB #0, the test module 42 of BB #1 returns different data 0x55553555. When the test module 42 of BB #0 compares the transmitted data with the received data, both do not match. Consequently, the test module 42 of BB #0 reports an abnormality in the XB communication.

FIG. 39 is a diagram illustrating an execution example of diagnosis. In FIG. 39, "XSCF>diagxbu 0-3" indicates an instruction for the crossbar diagnosis for BB #0 to BB #3. "XBU diagnosis is about to start, Continue?[y|n]:y" indicates an execution instruction for the confirmation of execution of the crossbar diagnosis. "Power on sequence started." indicates that the power-on processing for diagnosis has started. "XBU diagnosis started." indicates that the crossbar diagnosis has started. "Power off sequence started." indicates that the processing to shut off power that was turned on for diagnosis has started. The following "completed." indicates that the crossbar diagnosis has ended.

FIG. 40 is a diagram it examples of an error log. FIG. 40 illustrates one example each of the XB communication abnormality and the XB cable connection error. In the XB communication abnormality, it is recorded that an abnormality has occurred in the crossbar cable 20 connecting between XBU #1 of BB #4 and XBU #1 of BB #0. In the XB cable connection error, it is recorded that an error has occurred in cable connection between XBU #0 of XBBOX #80 and XBU #0 of BB #0.

As described above, in present embodiment, the hardware controller 33 of the XSCF gives an instruction for the crossbar diagnosis to the XBU. The XBU includes the port information storage unit 41 and the test module 42, in which the port information storage unit 41 stores therein the port information, and the test module 42 performs the crossbar diagnosis using the port information. Consequently, the information processing system 1 can perform the crossbar diagnosis without using the CPU 81, and the memory 82, and the crossbar diagnosis can be performed while the operation of the information processing system 1 is continued.

In the present embodiment, the configuration determining unit 32 determines the range of the crossbar diagnosis on the basis of the user's use environment, and on the basis of the determined diagnosis range, the power-on pattern exclusive for diagnosis is determined. The hardware controller 33 powers on on the basis of the power-on pattern. Consequently, the information processing system 1 can perform the crossbar diagnosis by operating the apparatuses required for the diagnosis.

In the present embodiment, the configuration determining unit 32 creates the port information on the basis of the determined diagnosis range, and the hardware controller 33 sets the port information in the port information storage unit 41 of the XBU. Consequently, the information processing system 1 can perform the crossbar diagnosis by setting the information required for the diagnosis.

In the present embodiment, the storage unit of the XSCF stores therein the partition configuration information, the partition operation information, and the CMI information, and the configuration determining unit 32 determines the range of the crossbar diagnosis on the basis of the partition configuration information, the partition operation information, and the CMI information. Consequently, the configuration determining unit 32 can correctly determine the diagnosis range that does not affect the user's use environment.

In the present embodiment, the configuration determining unit 32 determines the power-on pattern on the basis of which of the whole of its own apparatus, the XBU, and the port 43 is to be diagnosed. Consequently, the hardware controller 13 can power on for diagnosis without affecting the user's use environment when the XBU and the port 43 are partially being used.

In the present embodiment, the XBU includes the port information storage unit 41 for each port 43, and one test module 42 performs the crossbar diagnosis for all ports 43. Consequently, the XBU can reduce a hardware amount compared with a case in which the test module 42 is provided for each port 43.

Although the present embodiment explains the XSCF, the configuration of the XSCF is implemented by software, thereby obtaining a diagnosis program having a similar function. A computer that executes the diagnosis program will be explained.

Figure 41:
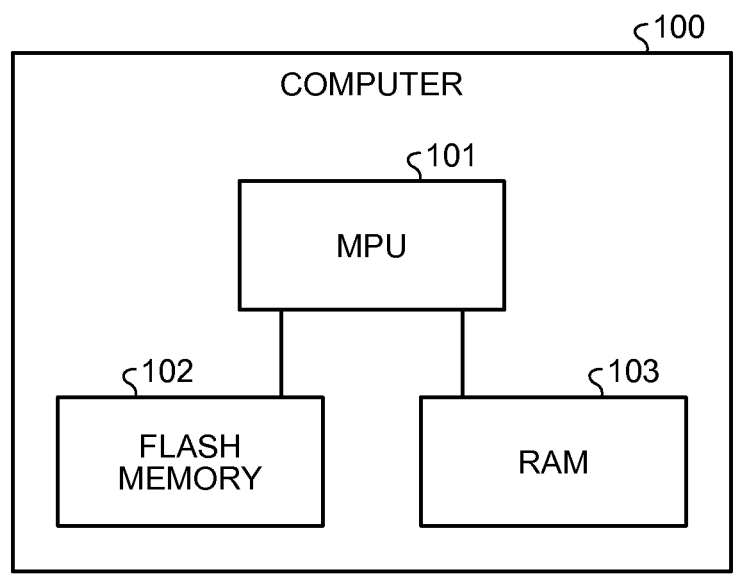
FIG. 41 is a diagram illustrating a hardware configuration of a computer that executes a diagnosis program according to the present embodiment.

FIG. 41 is a diagram illustrating a hardware configuration of the computer that executes the diagnosis program according to the present embodiment. As illustrated in FIG. 41, this computer 100 includes a micro processing unit (MPU) 101, a flash memory 102, and a RAM 103.

The MPU 101 is a processing unit that reads a program stored in the RAM 103 and executes the program. The flash memory 102 is a non-volatile memory storage device that stores therein the program and data. The RAM 103 is a memory that stores therein the program, execution halfway results of the program, or the like and stores therein the information of the storage unit of the XSCF. The diagnosis program stored in the flash memory 102 is read to the RAM 103 and is executed by the MPU 101.

According to an embodiment, crossbar diagnosis can be performed while the operation of an information processing system is continued.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate, to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a controller that controls the information processing apparatus; and
a crossbar unit that performs communication with another information processing apparatus,
the controller comprising:

a determining unit that determines a target range of crossbar diagnosis;

a power-on unit that powers on the target range determined by the determining unit; and an instructing unit that instructs the crossbar diagnosis to the crossbar unit, and the crossbar unit comprising:

a diagnosis information storage unit that stores therein diagnosis information related to the crossbar diagnosis; and a diagnosing unit that performs the crossbar diagnosis based on the diagnosis information stored in the diagnosis information storage unit.

2. The information processing apparatus according to claim 1, wherein the controller further comprises:

a creating unit that creates the diagnosis information based on the target range determined by the determining unit; and a setting unit that sets the diagnosis information created by the creating unit in the diagnosis information storage unit.

3. The information processing apparatus according to claim 1, wherein the controller further comprises a control information storage unit that stores therein information indicating whether the information processing apparatus is assigned as an apparatus to be used, information indicating whether the information processing apparatus is powered on, and information indicating whether a memory is shared by another information processing apparatus, and the determining unit determines the target range of the crossbar diagnosis based on the pieces of information stored in the control information storage unit.

4. The information processing apparatus according to claim 1, further comprising a plurality of crossbar units, each of the crossbar units comprising a plurality of ports, wherein the determining unit determines the information processing apparatus, a specific crossbar or a specific port as the target range of the crossbar diagnosis.

5. The information processing apparatus according to claim 1, wherein the crossbar unit comprises a plurality of ports and the diagnosis information storage unit for each of the ports, and the diagnosing unit performs the crossbar diagnosis with the ports as targets.

6. A method of diagnosing an information processing apparatus that comprises a controller that controls the information processing apparatus and a crossbar unit that performs communication with a processing unit of another information processing unit, the method comprising:

by the controller, determining a target range of crossbar diagnosis, powering on the target range determined at the determining, instructing the crossbar diagnosis to the crossbar unit, and by the crossbar unit, performing the crossbar diagnosis based on diagnosis information stored in a storage unit with respect to the crossbar diagnosis.

7. A non-transitory computer-readable storage medium having stored therein a program that performs crossbar diagnosis on an information processing apparatus that comprises a controller that controls the information processing apparatus and a crossbar unit that performs communication with a processing unit of another information processing unit, the program causing a computer to execute a process comprising:

determining a target range of the crossbar diagnosis;

powering on the target range determined at the determining; and instructing the crossbar diagnosis on the determined target range to the crossbar unit.

* * * * *